Nov. 15, 1932.  G. C. CHASE  1,888,161
AUTOMATIC CONTROL FOR CALCULATING MACHINES
Filed Jan. 7, 1926  21 Sheets-Sheet 1

Nov. 15, 1932.   G. C. CHASE   1,888,161
AUTOMATIC CONTROL FOR CALCULATING MACHINES
Filed Jan. 7, 1926   21 Sheets-Sheet 4
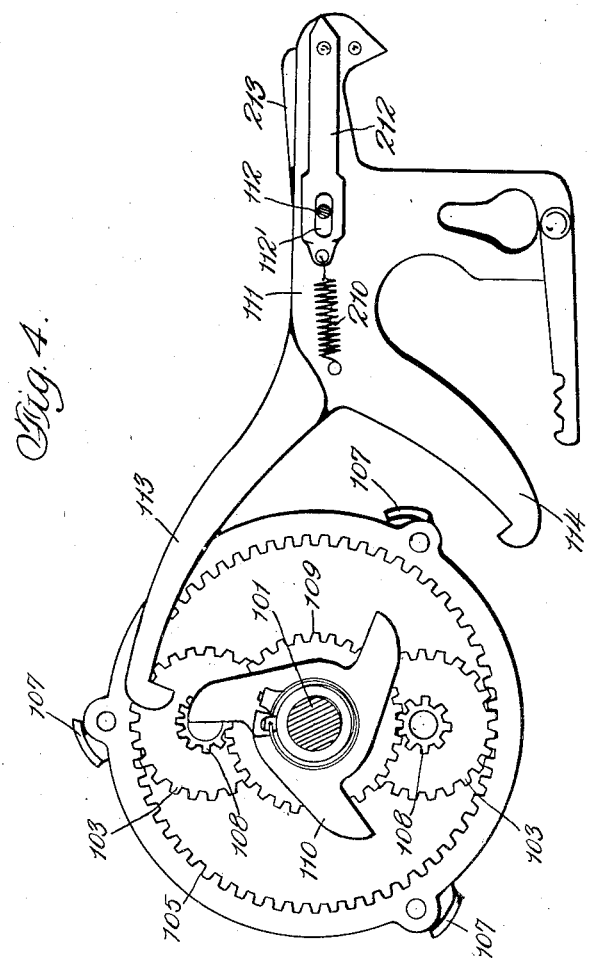
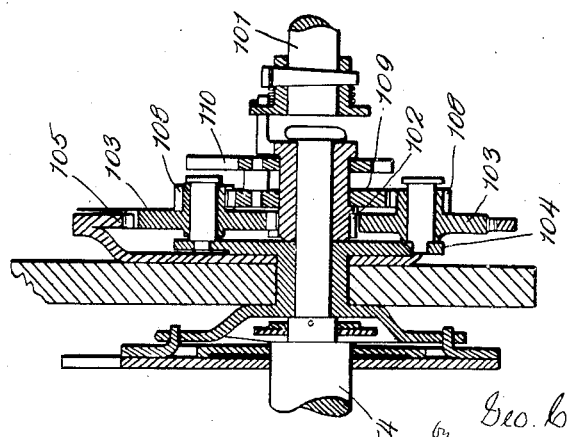
INVENTOR.
Geo. C. Chase.
by E.W. Anderson
ATTORNEYS Nov. 15, 1932.   G. C. CHASE   1,888,161
AUTOMATIC CONTROL FOR CALCULATING MACHINES
Filed Jan. 7, 1926   21 Sheets-Sheet 5
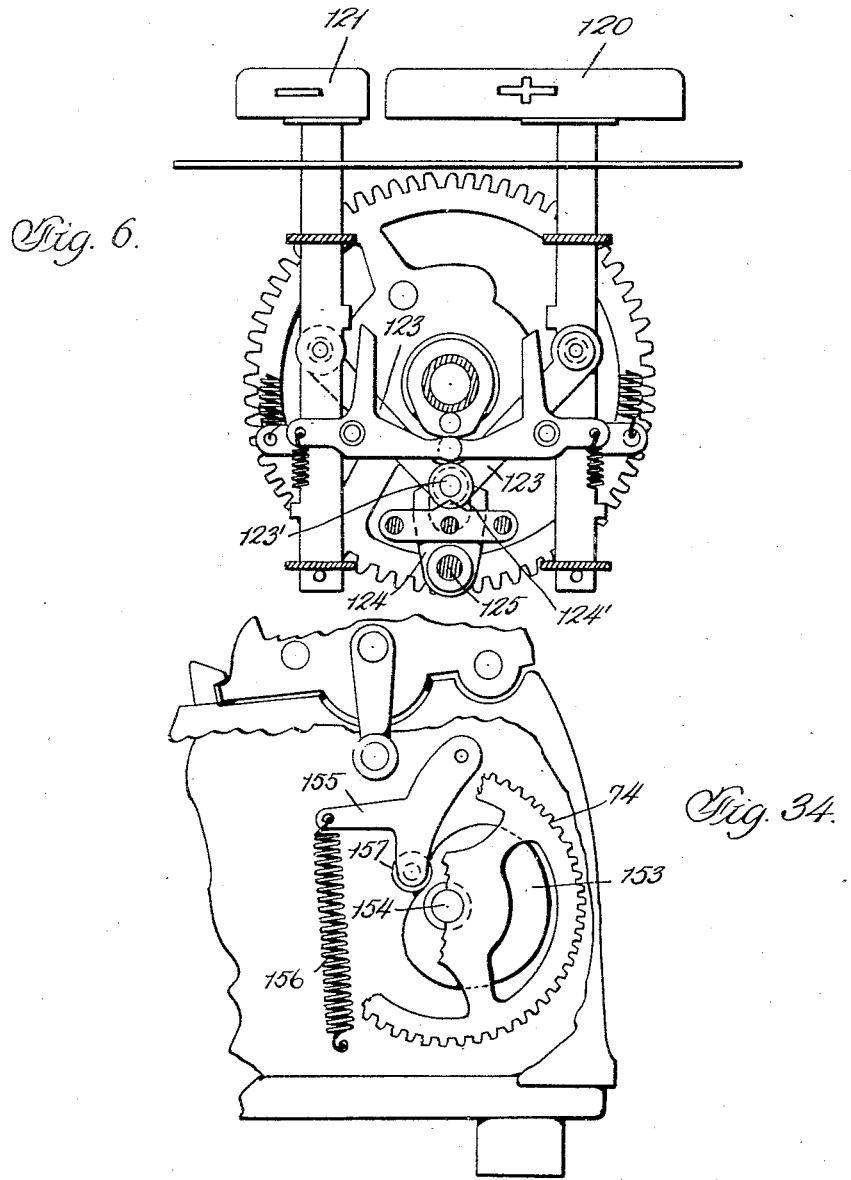

Nov. 15, 1932.　　　　　G. C. CHASE　　　　1,888,161
AUTOMATIC CONTROL FOR CALCULATING MACHINES
Filed Jan. 7, 1926　　21 Sheets-Sheet 7

INVENTOR
Geo. C. Chase.
by E. W. Anderson Jon
ATTORNEYS

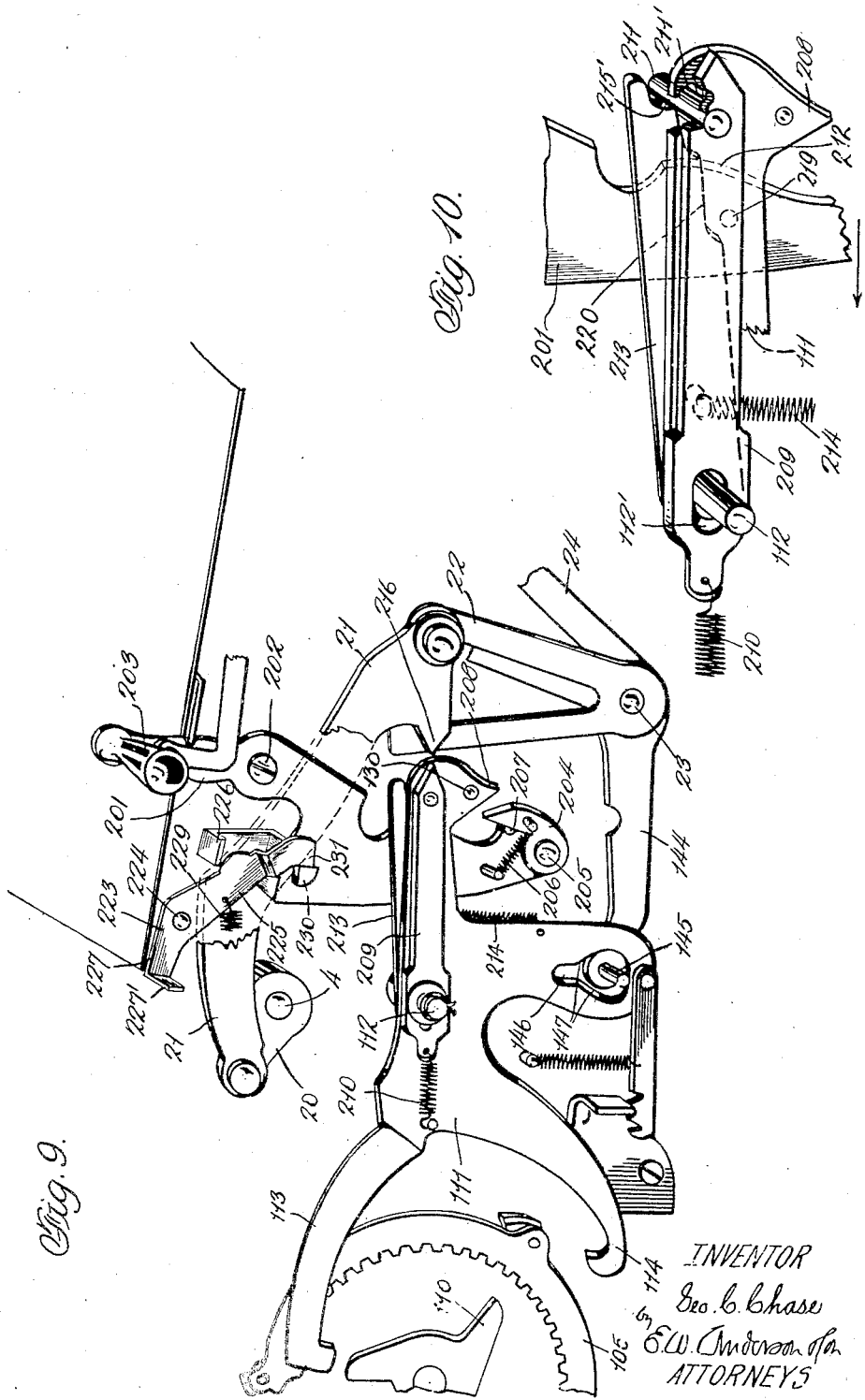

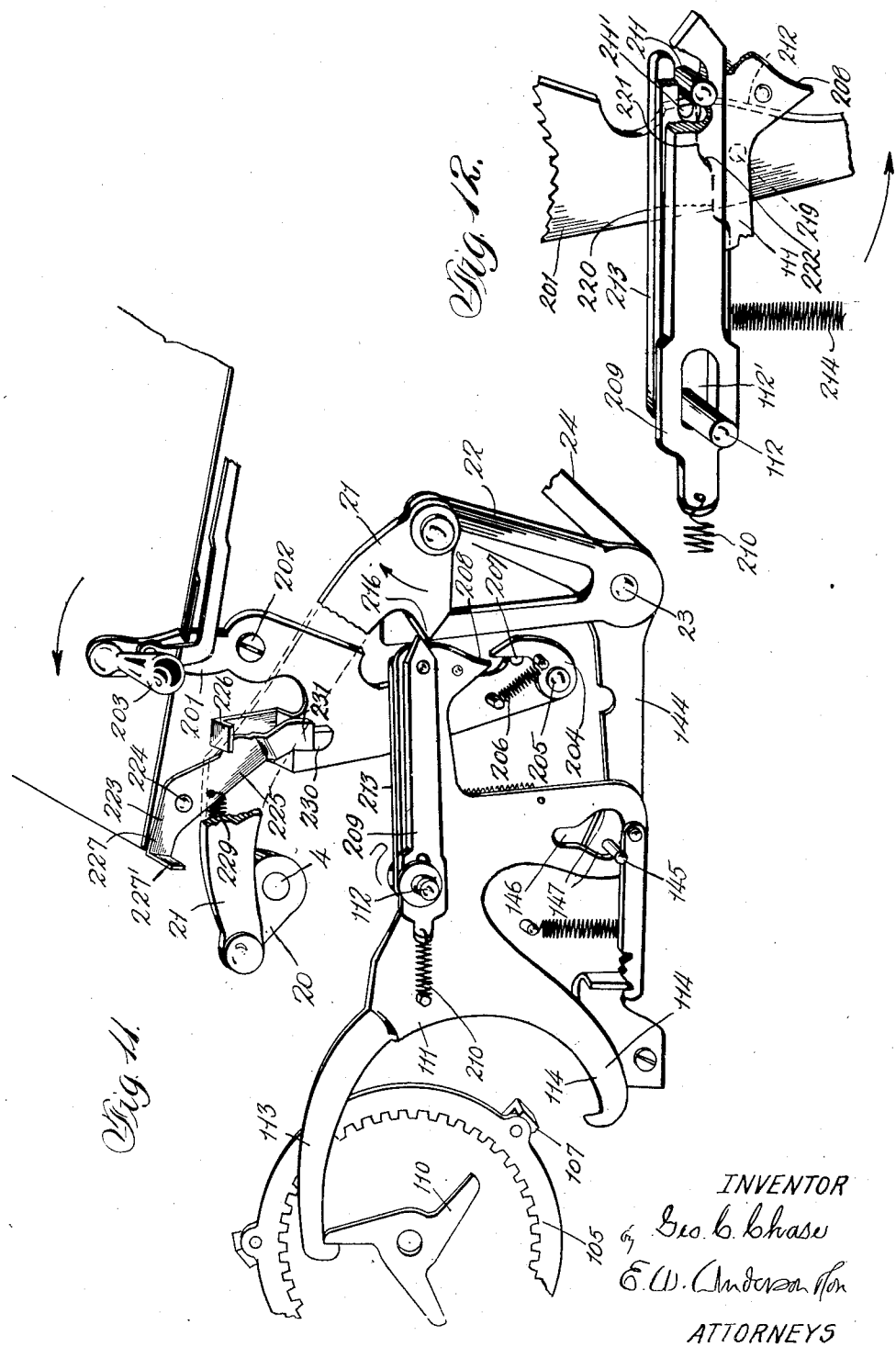

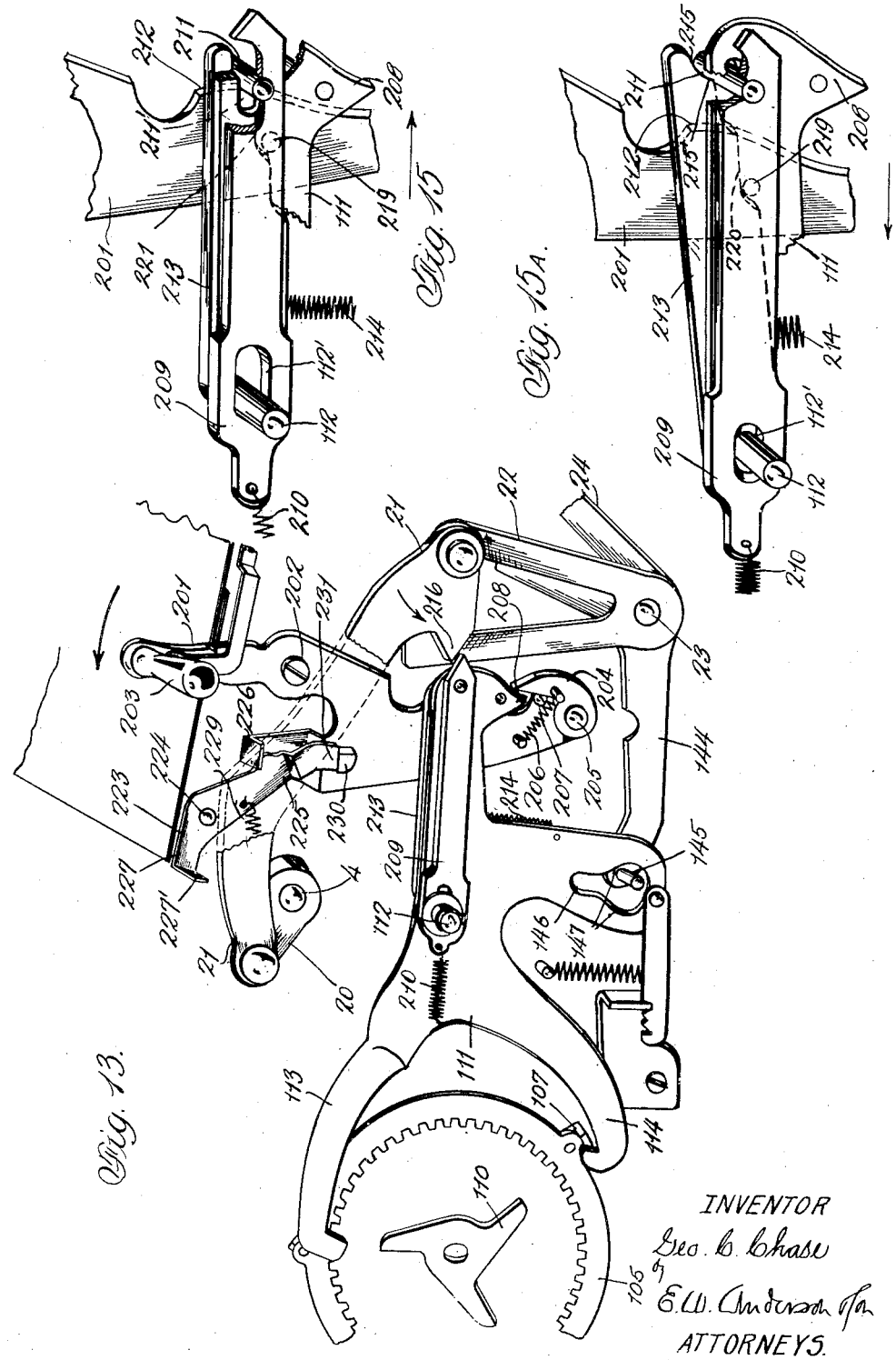

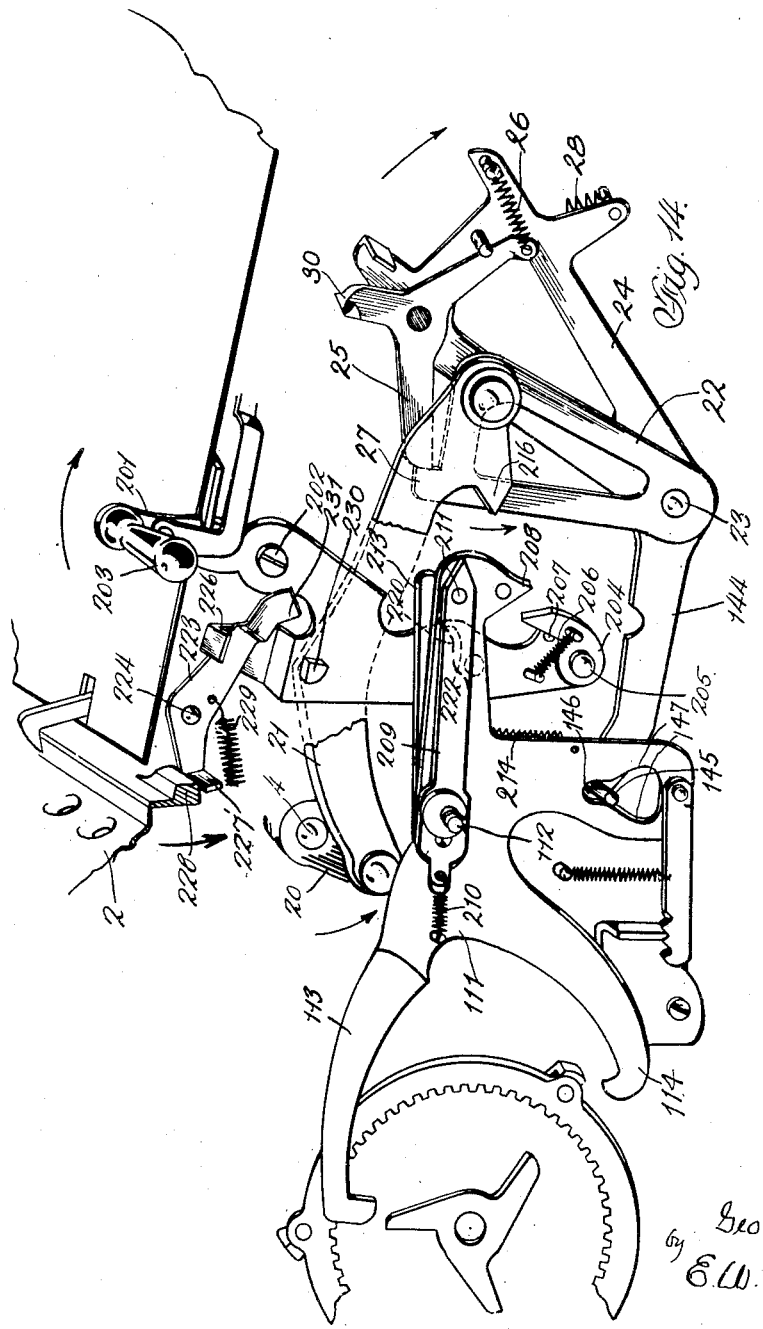

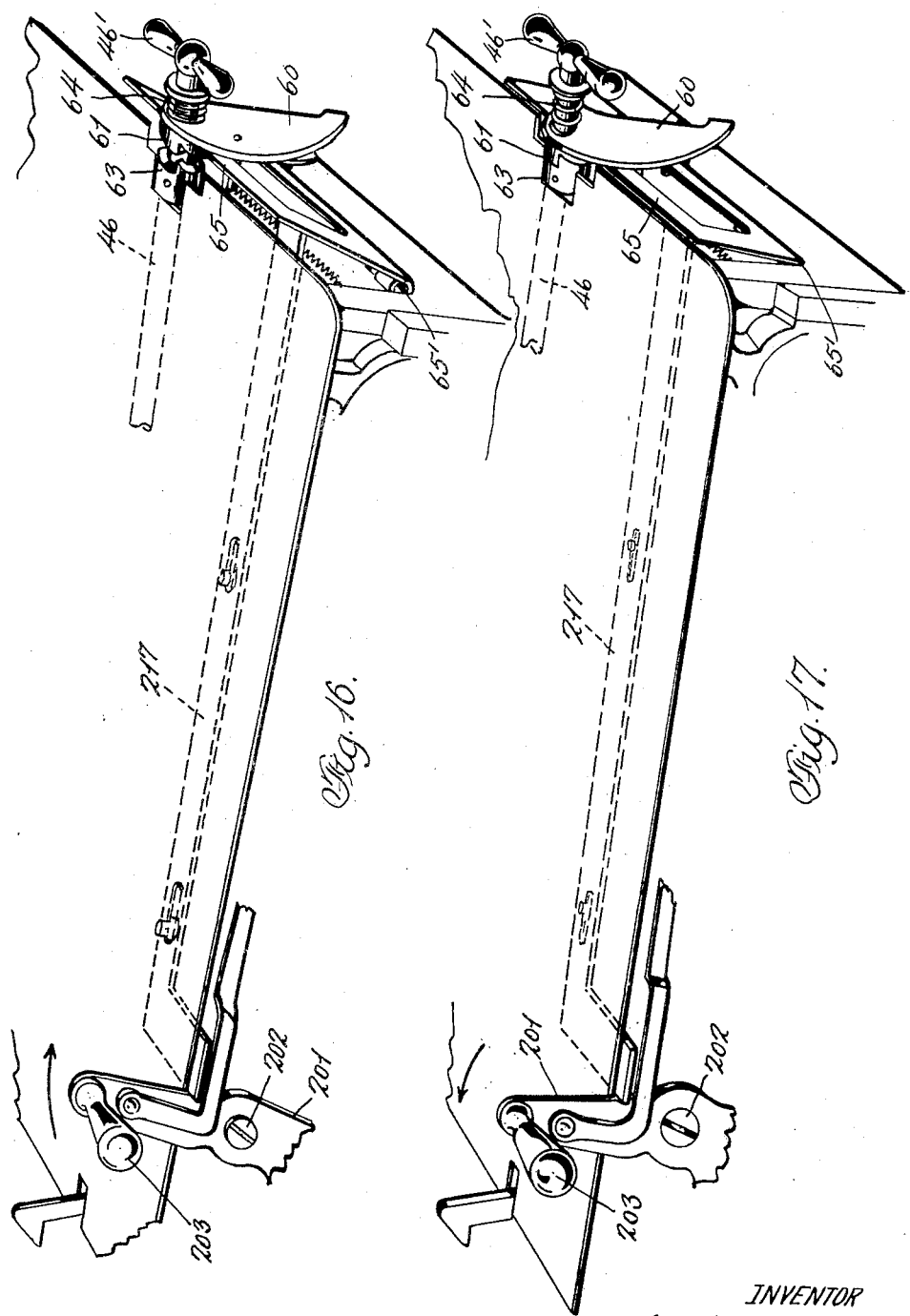

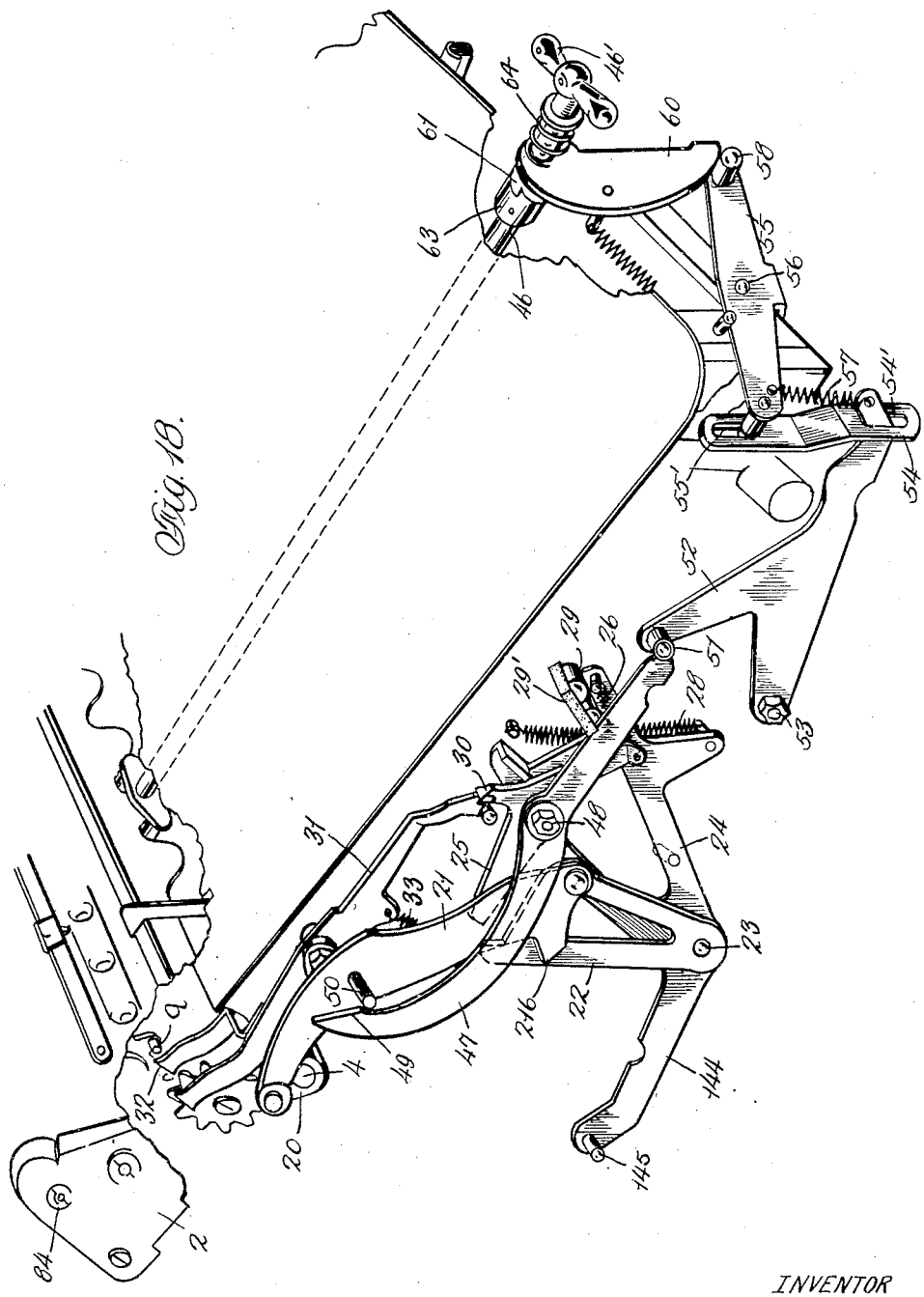

Nov. 15, 1932.    G. C. CHASE    1,888,161
AUTOMATIC CONTROL FOR CALCULATING MACHINES
Filed Jan. 7, 1926    21 Sheets-Sheet 14
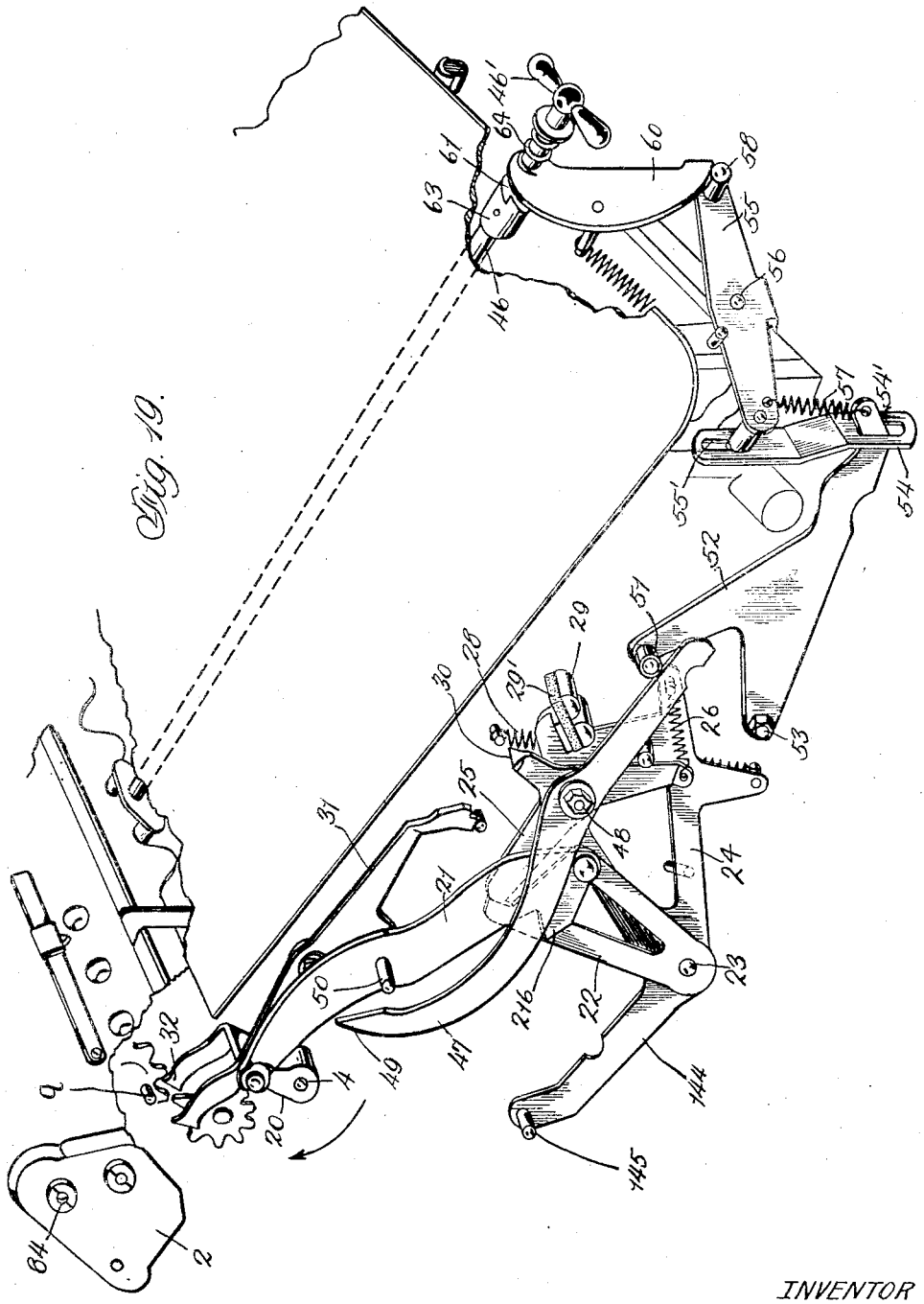
INVENTOR
Geo. C. Chase.
by E.W. Anderson
ATTORNEYS

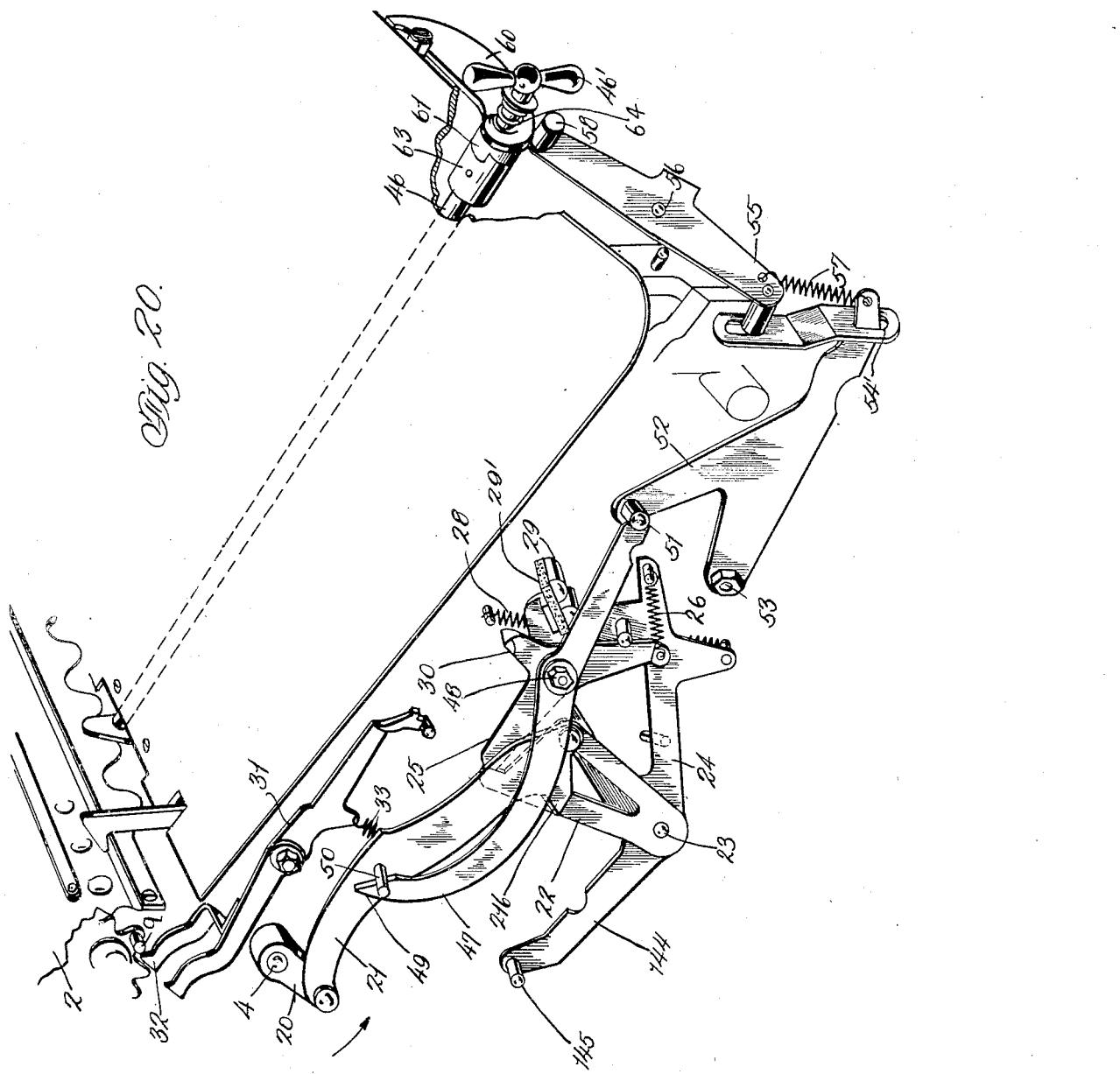

Nov. 15, 1932.  G. C. CHASE  1,888,161
AUTOMATIC CONTROL FOR CALCULATING MACHINES
Filed Jan. 7, 1926  21 Sheets-Sheet 16
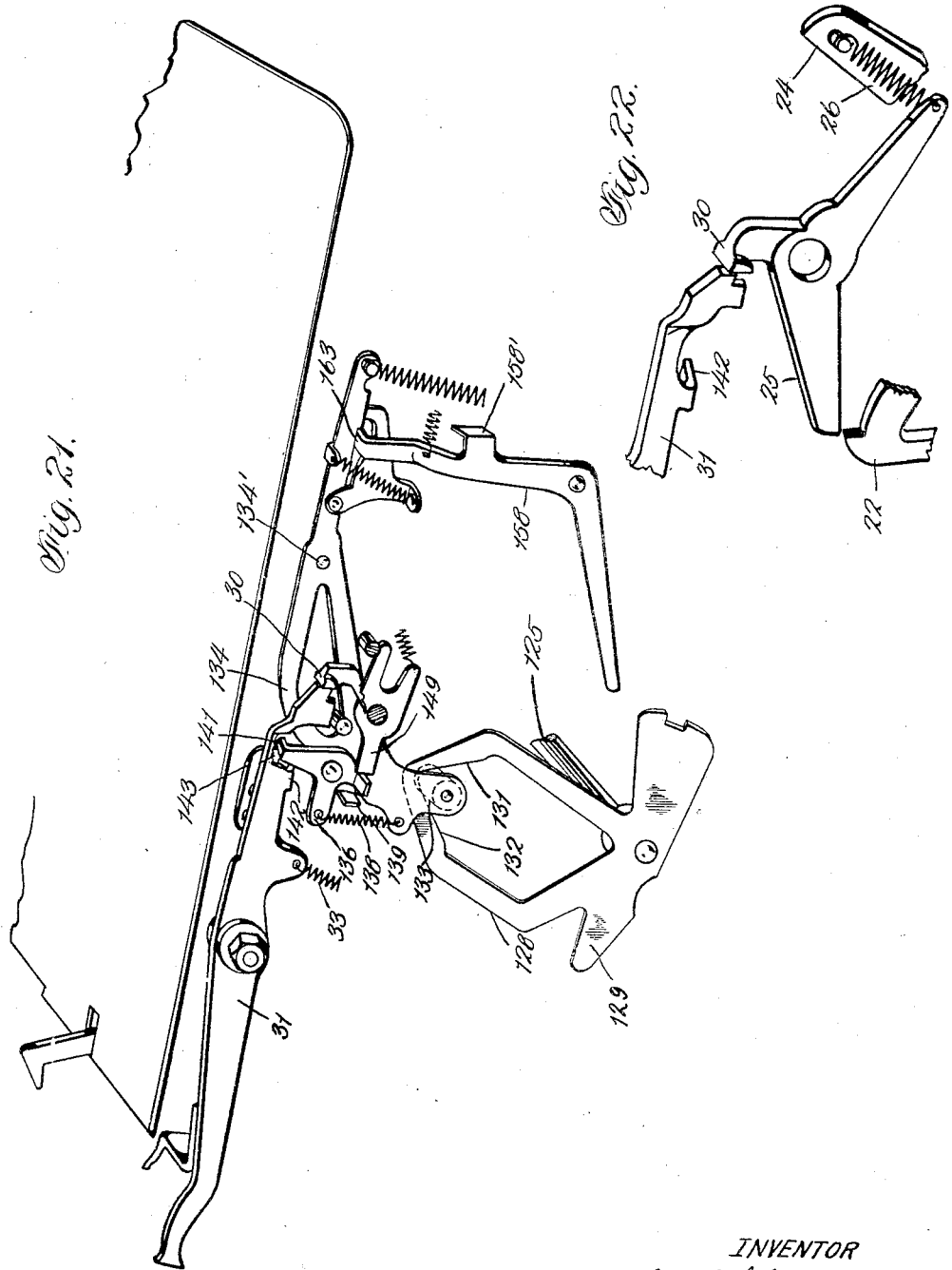
INVENTOR
Geo C. Chase.
by E.W. Anderson
ATTORNEYS Nov. 15, 1932.　　　　G. C. CHASE　　　　1,888,161
AUTOMATIC CONTROL FOR CALCULATING MACHINES
Filed Jan. 7, 1926　　21 Sheets-Sheet 17
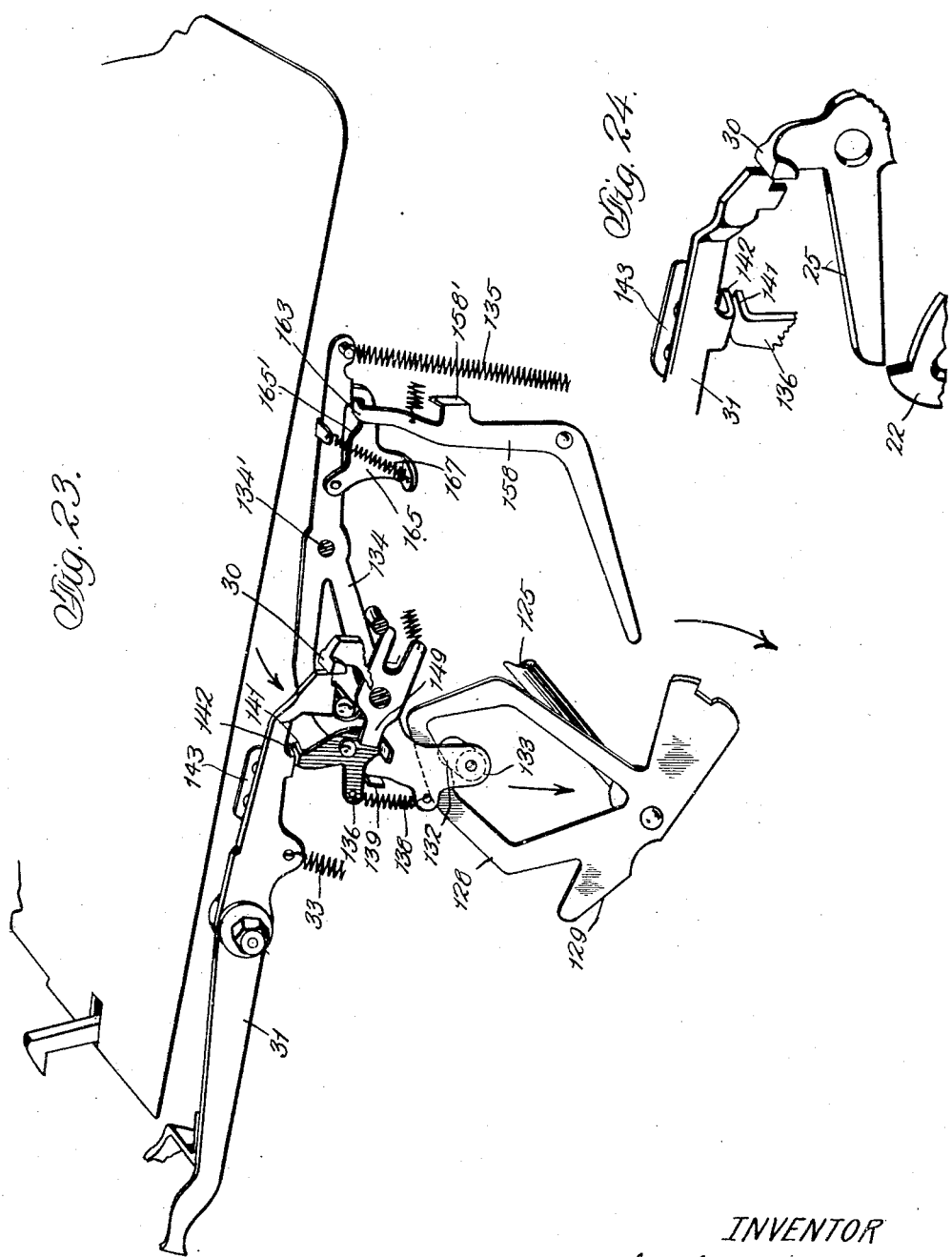
INVENTOR
Geo. C. Chase
by E. W. Anderson
ATTORNEYS.

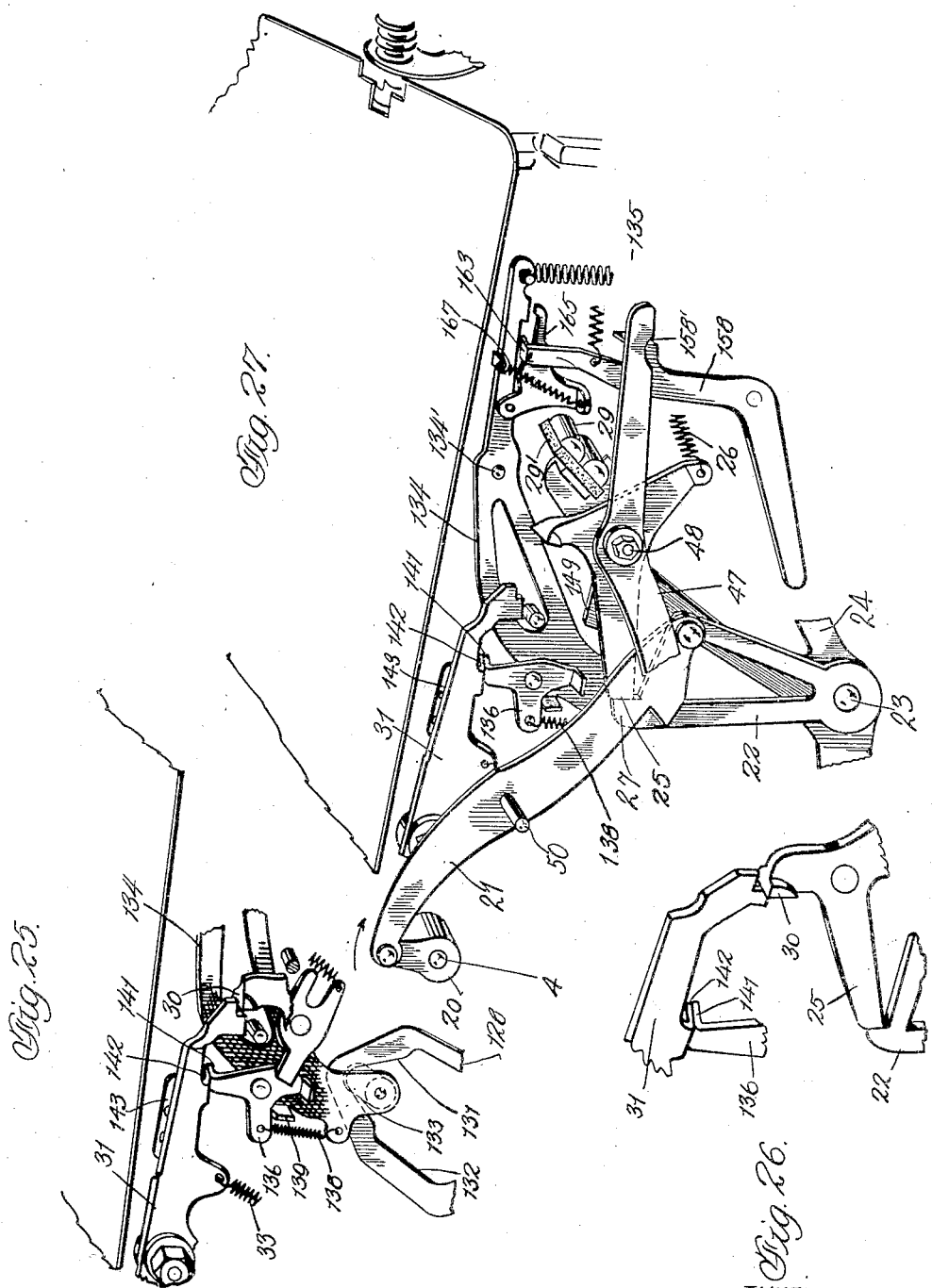

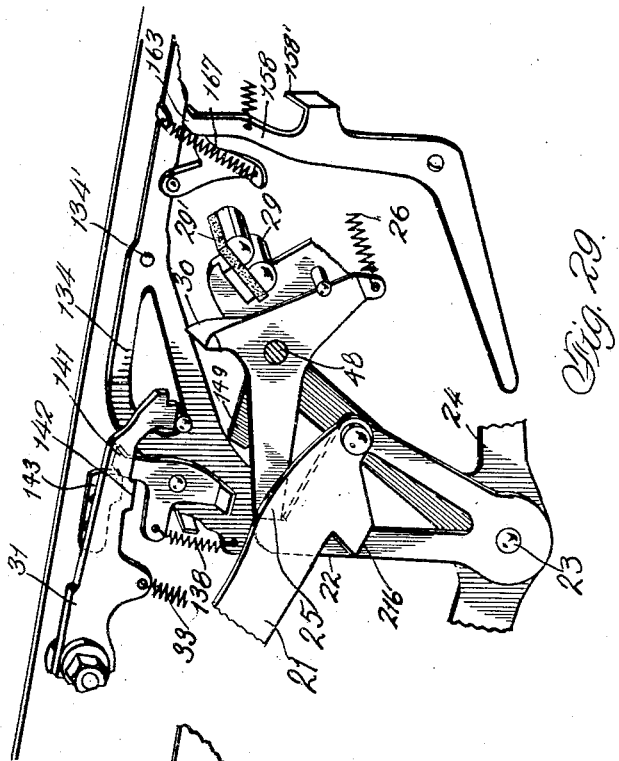
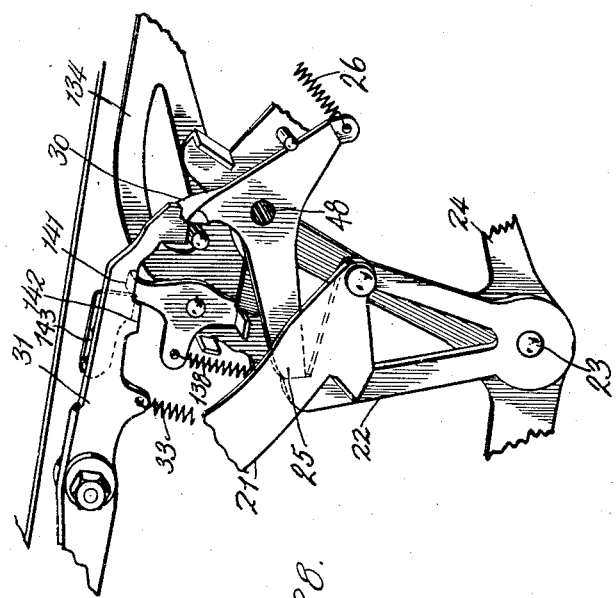

Nov. 15, 1932.    G. C. CHASE    1,888,161
AUTOMATIC CONTROL FOR CALCULATING MACHINES
Filed Jan. 7, 1926    21 Sheets-Sheet 20

INVENTOR
Geo. C. Chase
by E. W. Anderson Son
ATTORNEYS.

Nov. 15, 1932.    G. C. CHASE    1,888,161
AUTOMATIC CONTROL FOR CALCULATING MACHINES
Filed Jan. 7, 1926    21 Sheets-Sheet 21
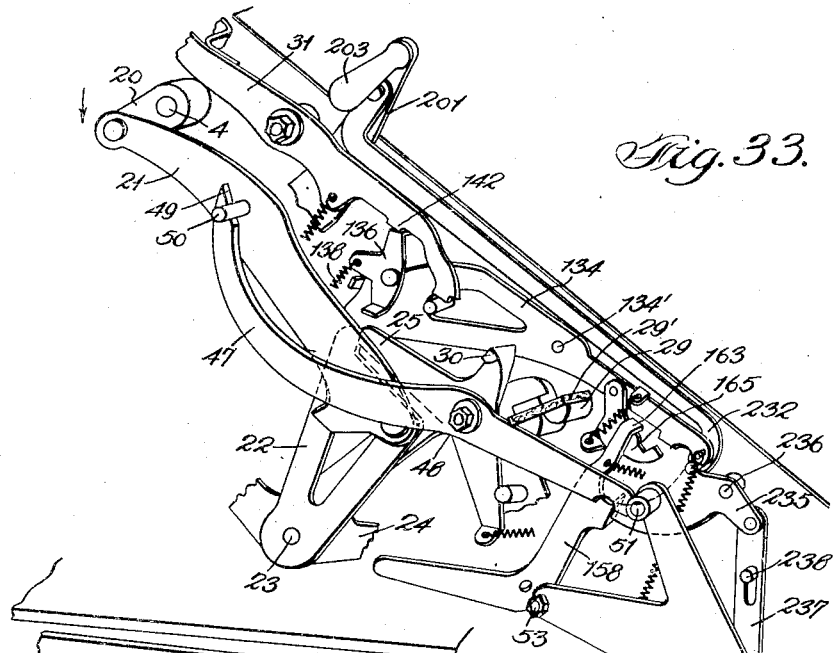
Fig. 33.
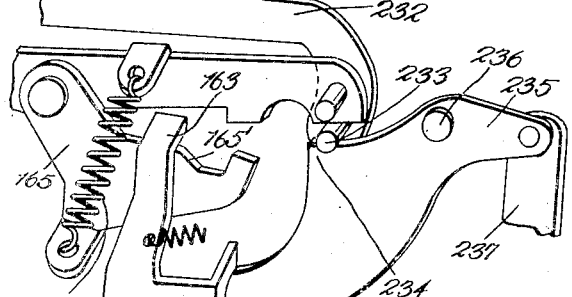
Fig. 32.
Fig. 30^A.
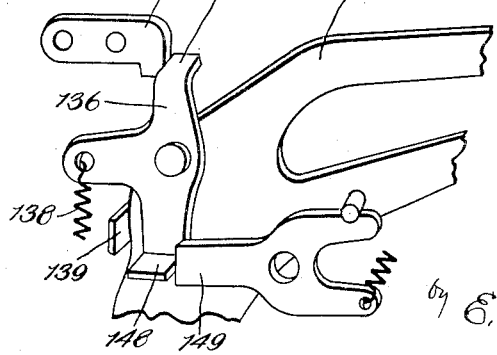
INVENTOR.
Geo. C. Chase.
by E. W. Anderson
ATTORNEYS.

Patented Nov. 15, 1932

1,888,161

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

AUTOMATIC CONTROL FOR CALCULATING MACHINES

Application filed January 7, 1926. Serial No. 79,811.

The invention relates to automatic control devices for calculating machines, and to combinations including the same, whereby various calculating operations are simplified, the number of manipulations therein reduced, and alternative methods of operation permitted, so that the operator may employ the method best adapted to the work in hand. Primarily the invention relates to mechanisms and combinations used in the solution of problems in division.

An object of the invention is the provision of a calculating machine combining in a unitary mechanism means for solving problems in division by either of the known methods, the "built up" method and the "tear down" or "subtractive" method, with maximum efficiency.

Another object of the invention is the provision in a motor driven machine of improved means for automatically releasing and reeffecting a clutch between the actuating means of the machine and the motor.

Another object is the provision of means for effecting automatic division in a machine employing actuating means having a reversible cycle of operation.

Another object is the provision of means for effecting automatic division in a machine which may be operated alternatively by a two-way crank or by a one-way driving means.

Another object is the provision in a machine having a stop device operating to prevent movement of the actuating mechanism in one direction only; of means for alternatively operating said stop device to prevent movement in either direction.

Another object is to provide improved means for automatically shifting the numeral wheel carriage of a calculating machine during the movement of the numeral wheel actuating means.

Another object is to provide means manually operable at any period of the calculation to stop the machine upon the complete registration of the quotient figure being computed.

The invention consists in the novel construction and combination of parts, as set forth in the appended claims.

Mechanism of previous patents

U. S. Reissue Patent No. 13,842, for calculating machines, issued to F. S. Baldwin; Patent No. 1,474,230, issued to E. F. Britten, Jr.; Patent No. 1,544,806, issued to George C. Chase, entitled Full-cycle stop, and Patent No. 1,566,650, issued to George C. Chase, entitled Operating means for calculators, fully disclose the prior mechanism upon which the present disclosure is based. Said mechanism will be briefly referred to hereinafter, the reference numerals upon the drawings of the said Chase patents being retained.

The above-named patents, illustrating the machine which, together with the present improvements, constitutes the preferred form of my invention, disclose numeral wheel actuating mechanism of the reversible cycle type, as set forth fully in Patent No. 1,566,650. Such machines employ a cycle of not less than three phases, a phase of ordinal registration in mid-cycle and a phase of tens carrying registration upon each side of the ordinal registration phase. the tens carrying phase which follows the ordinal registration alone being effective to register. The succession of the phases of the cycle may be reversed, so that the carry phase effective in positive registration, for instance, which follows the ordinal registration phase during additive calculations, will precede the latter phase in negative or subtractive calculations.

As clearly indicated in Patent No. 1,474,230, the normal position of the driving mechanism is that wherein a similar degree of movement thereof in either direction will complete a cycle of operation, and the first quarter rotation of the mechanism from normal position in either direction is idle with respect to transmisison of movement to the numeral wheels, this quarter rotation forming the idle additive or subtractive carry phase of the cycle.

Methods of solving problems in division

In machines of the present type the known methods of solving problems in division may be classified in two groups known to the art as "built up division" and "tear down" or "subtractive division."

By the former method the operator starts the calculation with the numeral wheels at zero and the divisor on the keyboard. The divisor is registered upon the numeral wheels by repeated additions until the dividend (or the nearest smaller value possible) appears, when the revolutions counting wheels will register the quotient. If several quotient digits are to be determined the numeral wheel carriage is shifted toward the left and the operation repeated. Naturally, an overrun and corrective subtraction is of frequent occurrence.

The well known "short cut" method, whereby the total number of operative cycles is reduced by the use of a combination of additive and subtractive registrations, is commonly employed in "built up" operations.

Certain combined operations are possible when the "built up" method is followed which cannot be performed by the "tear down" method. For instance, the problem $\dfrac{a\ \ b}{c}$ may be solved by a single operation, by a well known application of the "built up" method.

Essentially, "tear down" division consists of a series of subtractions, the divisor being subtracted from the dividend previously registered upon the numeral wheels as many times as possible in order to determine the quotient. The first quotient figure is derived by subtracting the divisor as many times as possible from the highest order of the dividend in which the divisor is contained, the second quotient figure by subtracting it from the highest remaining order in which it is contained, and so on. If the divisor is subtracted once more than the number of times it is contained in the corresponding portion of the dividend, a negative numeral wheel reading will be obtained which is a complementary number, theoretically involving a series of 9's to infinity. In the machine, these 9's will register as far as carry-over mechanism is provided. This carry-over action which occurred as the numeral wheels passed from a positive to a negative registration may be termed a transitional carrying operation. The numeral wheels having been thus brought to register a negative value, a forward or additive operation will result in the registration of a positive value upon the numeral wheels, a transitional carry occurring in this case also. This transitional carrying operation has been utilized to provide for the automatic determination of a quotient, for which no means are available in "built up" division.

Patent No. 1,544,806 shows how a transitional carrying operation may serve to stop the machine, while the present invention further utilizes said operation to reverse the direction of rotation of the actuating means and to step the numeral wheel carriage toward the left at the conclusion of every additive registration.

The sequence of operations involved in the determination of each quotient figure are therefore as follows: The machine being in operation, the divisor is subtracted until a transitional carry occurs, which involves a number of revolutions one greater than the quotient digit. The drive is then automatically reversed and the error corrected by a single additive revolution. The transitional carry following an additive revolution first steps the numeral wheel carriage one order toward the left and then reverses the driving mechanism, bringing the machine into condition to continue the process in the next order, for the determination of the second quotient figure.

A limitation of this, as of all other methods for rendering division fully automatic, lies in the possibility that the dividend may be a negative value. In solving such a problem by the transitional carry stop method, the succession of subtractive and additive operations must be reversed, so that an additive operation will first occur. On the present machine this operation may be performed by a two-stroke automatic method, by holding down the add key until the machine stops and then operating the division lever.

*Figures of the drawings*

In the accompanying drawings, illustrating the invention:

Figure 4 is a side view of the planetary gearing and associated members.

Figure 5 is a vertical section through the same, taken on the line of the carry shaft.

Figure 6 is a left side view of the add and subtract key group of mechanism.

Figure 9 shows the division key and reversing clutch lever mechanism and associated parts in normal position.

Figure 10 is an enlarged view of a portion of the mechanism shown in Fig. 9, with the parts also in normal position.

Figure 11 is a like view to Fig. 9 with division key and associated parts in operative position and reversing clutch lever and associated parts in subtractive position.

Figure 12 is an enlarged view of a portion of the mechanism shown in Fig. 11, with parts also in subtractive position.

Figure 13 is a like view to Fig. 9 with the division key and associated parts in operative position, and reversing clutch lever and associated parts set for additive registration.

Figure 14 is a like view to Fig. 9, but the division key has been restored to normal position by movement of the carriage to its extreme left hand position, and all parts are positioned to stop the machine, the quotient registering wheels having registered to capacity.

Figure 15 is an enlarged view of a portion of the mechanism of Fig. 13, showing the division key in operative position with parts in position for the additive registration of division, and to provide for further operation to register quotient figures.

Figure 15A is similar to Fig. 15, except that the divide key has been restored to normal, and the parts are also positioned for additive registration, but so as to prevent any further operation to register quotient figures.

Figure 16 shows the carriage clutch shifting mechanism and associated parts in normal position.

Figure 17 is a like view to Fig. 16 with parts in operative position.

Figure 18 shows the carriage shifting mechanism, positioned as in division with the machine registering repeated subtractions.

Figure 19 is similar to Figure 18 except the parts are shown in extreme position taken upon reversal from subtraction to addition.

Figure 20 is similiar to Figures 18 and 19, except the parts are shown in extreme position taken upon reversal from addition back to subtraction, with the carriage being shifted one step toward the left.

Figure 21 shows the mechanism for controlling the stopping action of the machine, all parts in normal position.

Figure 22 is an enlarged view of parts omitted from Fig. 21, for clearness.

Figure 23 is a like view to Fig. 21 with parts in position immediately after depressing the subtract key.

Figure 24 is similar to Fig. 22, but shows the parts in position to correspond with Fig. 23.

Figure 25 is a like view to Fig. 21 with parts in position taken immediately after the release of the subtract key (or the add key).

Figure 26 is similar to Fig. 22, but shows the parts in position to correspond with Fig. 25.

Figure 27 is a like view to Fig. 21 with parts in position at the extreme end of the subtractive movement, and on the point of reversing for the first rebound.

Figure 28 is similar to Fig. 21. but illustrates the action of the parts as the machine passes through the normal dead center position, following the first rebound.

Figure 29 is similar to Fig. 21, but illustrates the action after the parts pass through normal dead center position as shown in Fig. 28, after which all parts resume their normal position as in Fig. 21.

Figure 30A shows hidden details of Fig. 30, providing safeguard mechanism to insure proper operation of parts during division operations.

Figure 32 shows the division key restored to normal position, with the means for rendering the stop controlling mechanism again operative.

Figure 33 is a like view as Fig. 30, but with the divide key restored to normal position, and with the stop controlling mechanism now being operated to stop the machine.

Figure 34 is a side view of secondary means for retarding rebound.

*Numeral wheel actuating mechanism (Figures 1–8)*

Figure 1:
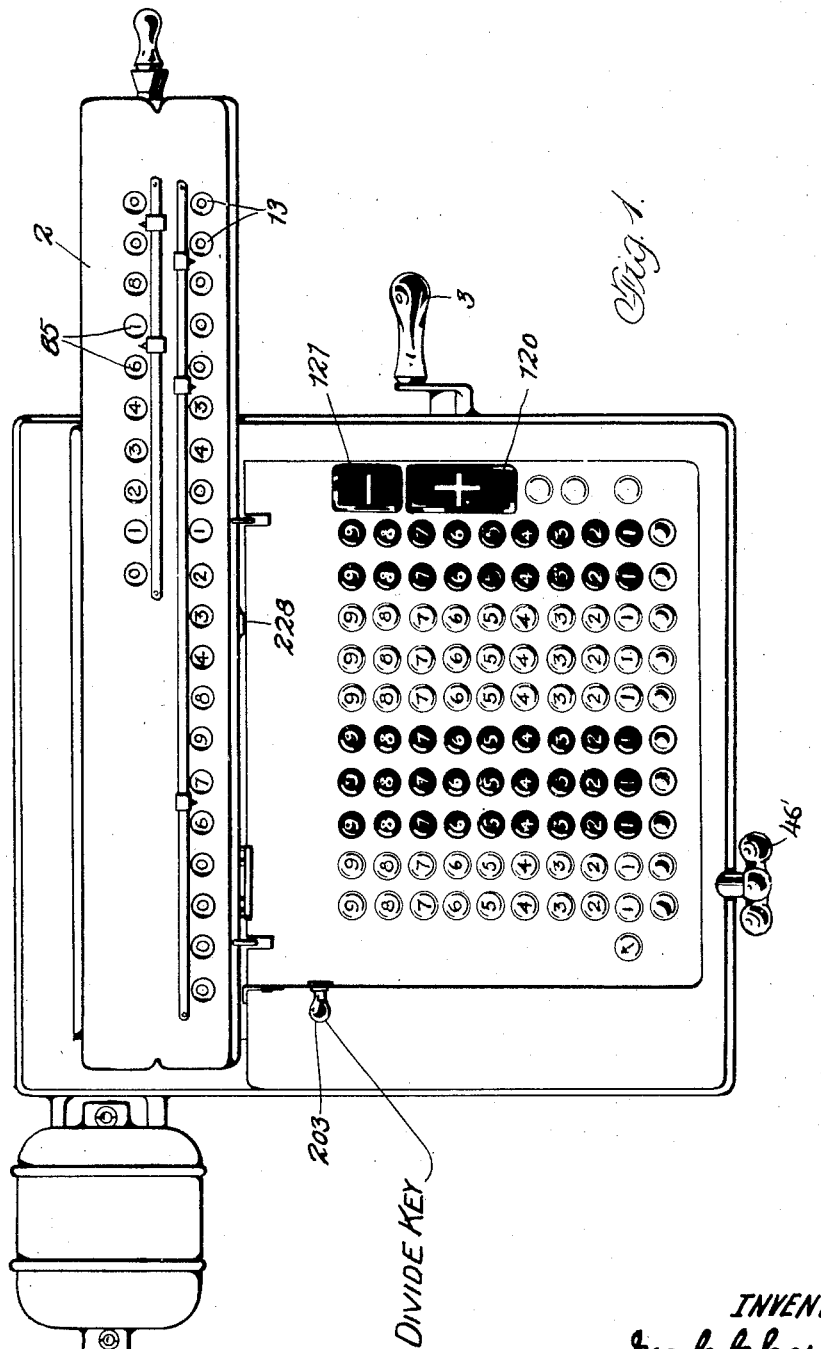
Figure 1 is a plan view of a calculating machine embodying the present invention.
Figure 2:
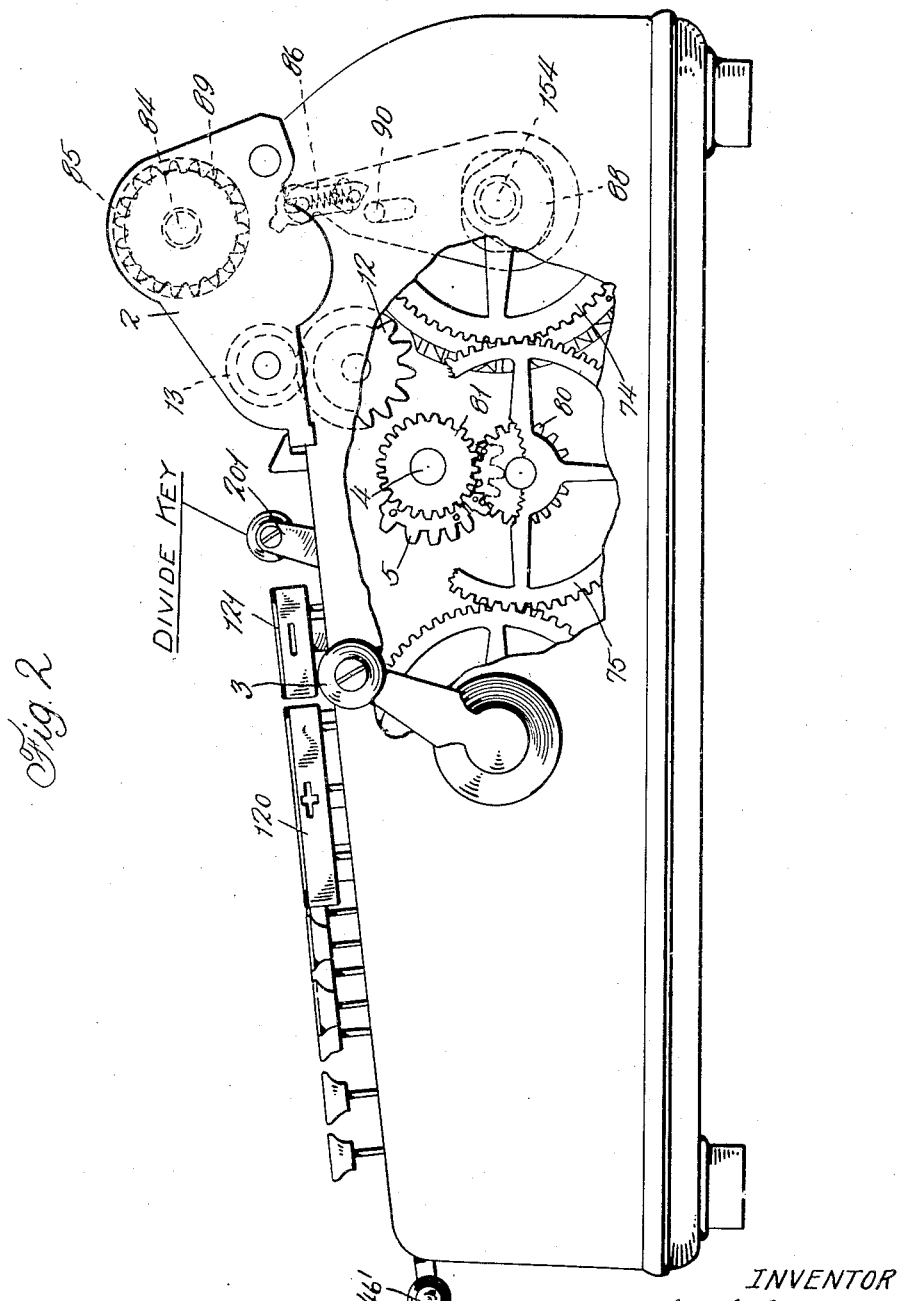
Figure 2 is a right side view of the machine with the casing partially broken away.

In the drawings the numeral 2 designates the transversely shiftable carriage, wherein are mounted numeral wheels 13, the gears of which are adapted to mesh with intermediate gears 12, the latter being driven by differential actuating gears 5 upon the shaft 4, all as disclosed in Patent No. 1,474,230. Amounts set up by the selecting mechanism are registered upon the numeral wheels, according to said application, by manipulation of the crank handle 3, having driving connection with the shaft 4, and it is to be noted that the present machine may be operated in this manner for solving problems in division, according to the method set forth in Patent No. 1,544,806. In performing the operation automatically, however, the machine is operated by means of the mechanism disclosed in Patent No. 1,566,650, in accordance with which construction drive shaft 101 is rotated in one direction only, by an electric motor or other suitable means. As shown, a system of planetary gearing is employed to transmit motion from the drive shaft 101 to the carry shaft 154 of the machine, the latter shaft having gear connection 74, 75, 80, 81, with the shaft 4 of the differential or selector gears, whereby actuation of the complete registering mechanism of the machine is provided for.

The planet gears 103 of the planetary system are supported upon arm 104, operatively connected to carry shaft 154, and mesh with sun gear 102, fast upon drive shaft 101, and with internally toothed gear 105, provided with clutch teeth 107. Each of the planet gears carries a pinion 108, meshing with a gear 109 having a toothed clutch member 110 fast thereto. A reversing clutch lever 111, fulcrumed to the framing at 112, has one arm thereof provided with upper and lower forks 113 and 114, engageable respectively, in different positions of the lever, with the subtraction clutch member 110 and with the addition clutch teeth 107 of gear 105. A third or intermediate position of lever 111 leaves gears 105 and 109 freely rotatable, which is the position of the parts with the motor running idly and the machine at rest. With lever 111 in clutch with the teeth 107 of gear 105, said gear is held fast and the machine set in motion, by utilizing the principle of planetary differential mechanism, the parts rotating in a direction proper to accomplish addition; while with said lever in clutch with member 110, gear 109 is held fast, and a reverse or subtractive rotation effected.

For purposes of general calculation, additive and subtractive operation keys 120, 121 may be employed, these keys controlling the position of reversing clutch lever 111 as set forth in Patent No. 1,566,650 as follows:

To the stems of the add and subtract keys are pivoted links 123, these links being pivoted together by stud 123', embraced by slot 124' of rock lever 124, fast upon rock shaft 125 extending transversely of the machine. At the end opposite lever 124 rock shaft 125 has loosely mounted thereon setting lever 128, normally locked to rotate with said shaft by means of coupling pawl 127 and arm 126. The rear end of setting lever 128 is provided with slot 129, embracing projection 130 of reversing clutch lever 111.

Figure 7:
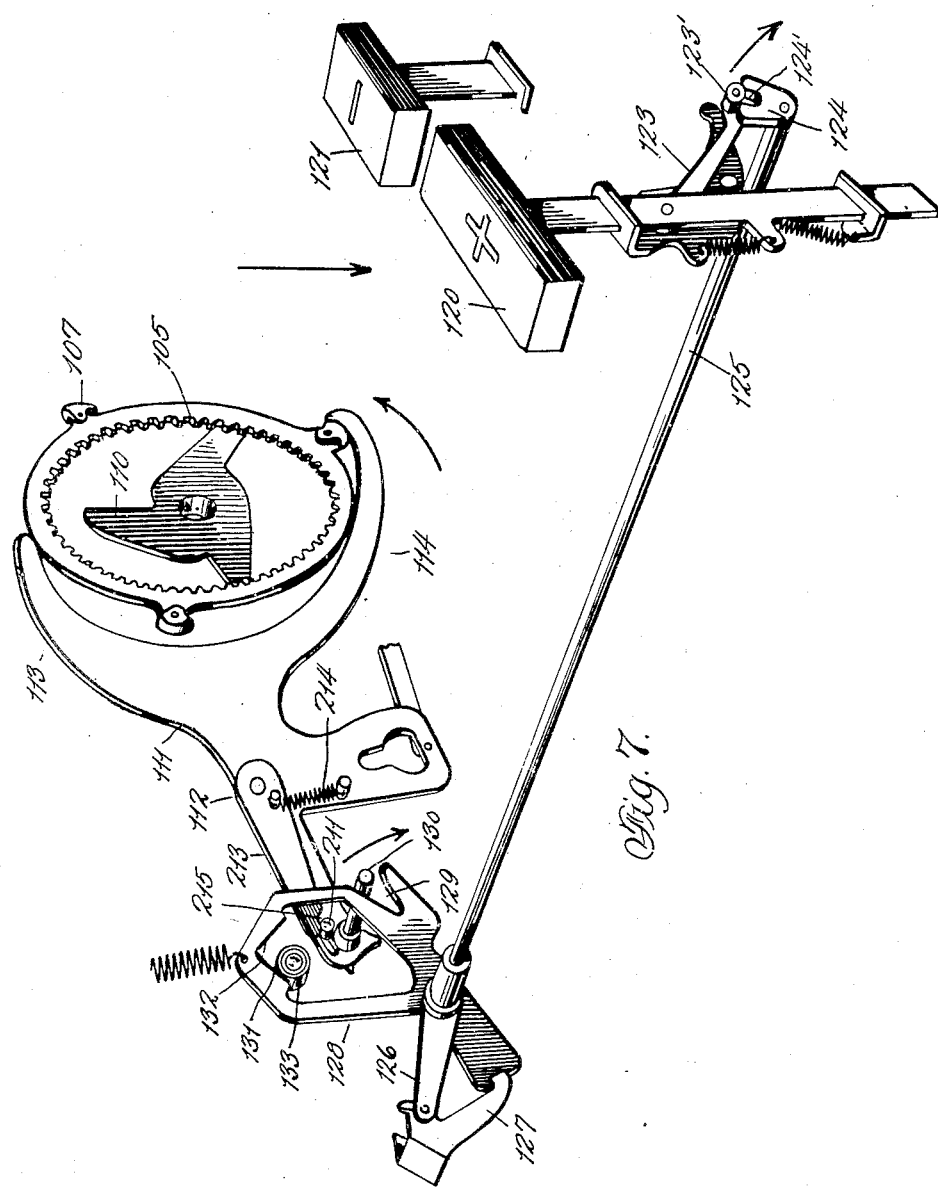
Figure 7 is a right side perspective view of the clutch operating mechanism, showing the add key depressed.
Figure 8:
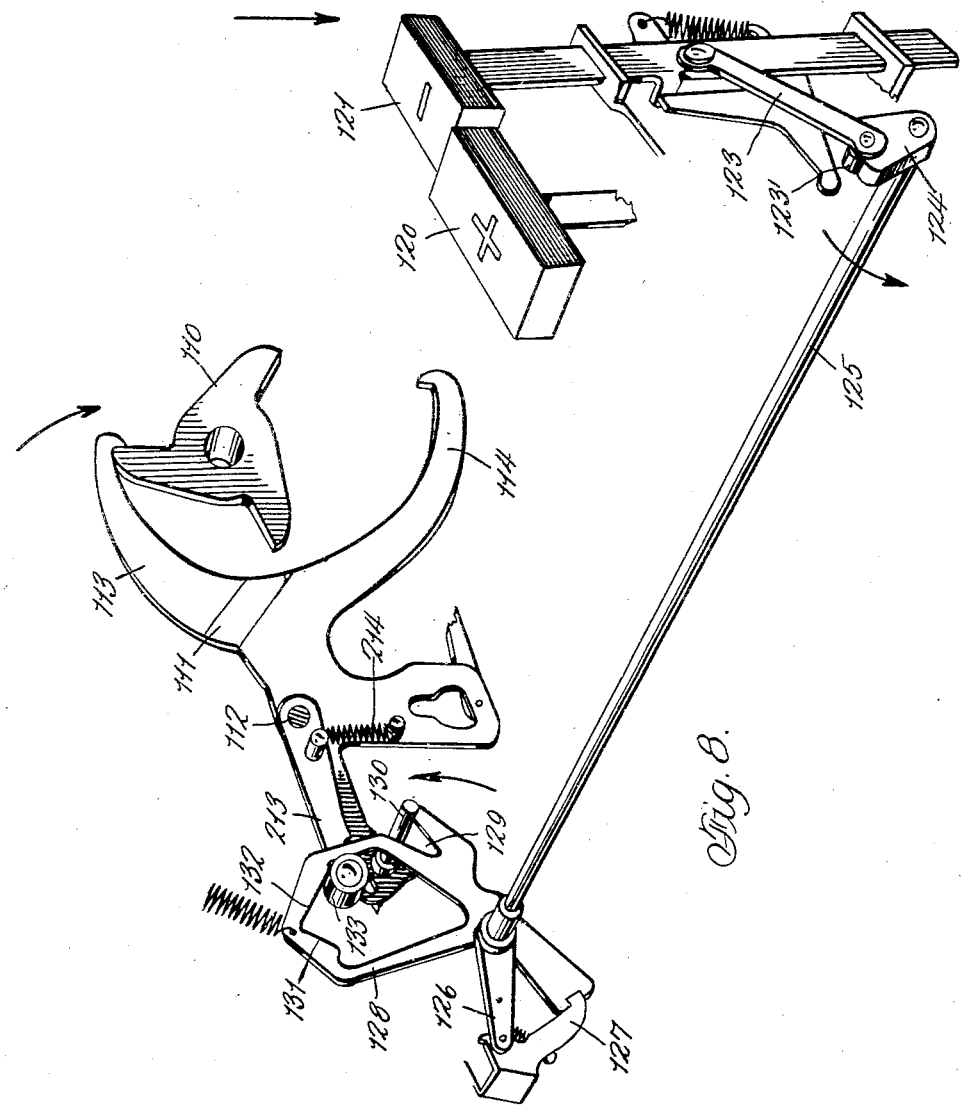
Figure 8 is a like view to Fig. 7 with the subtract key depressed.
Figure 30:
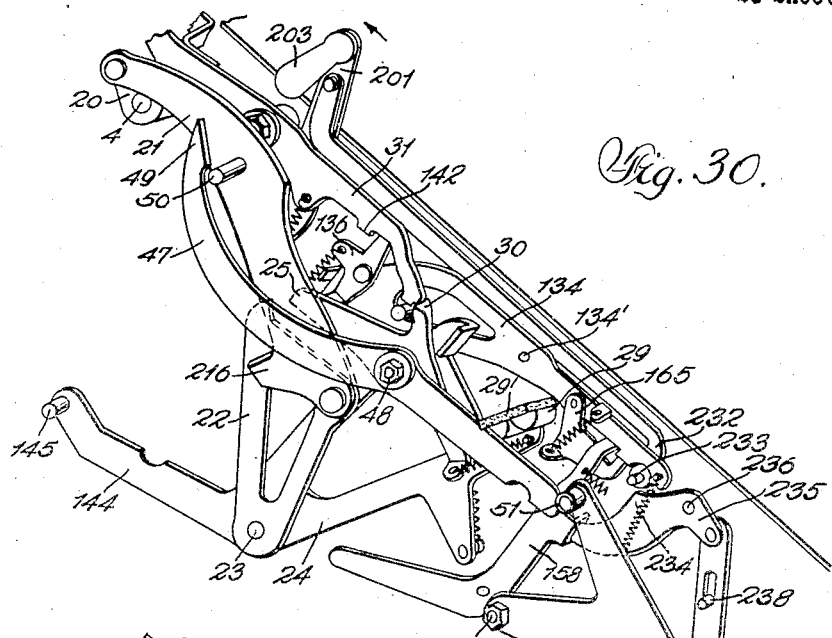
Figure 30 shows the means for rendering the stop controlling mechanism inoperative during the operation of automatic division, so that reversals of the rotation may occur without arresting the rotation.
Figure 31:
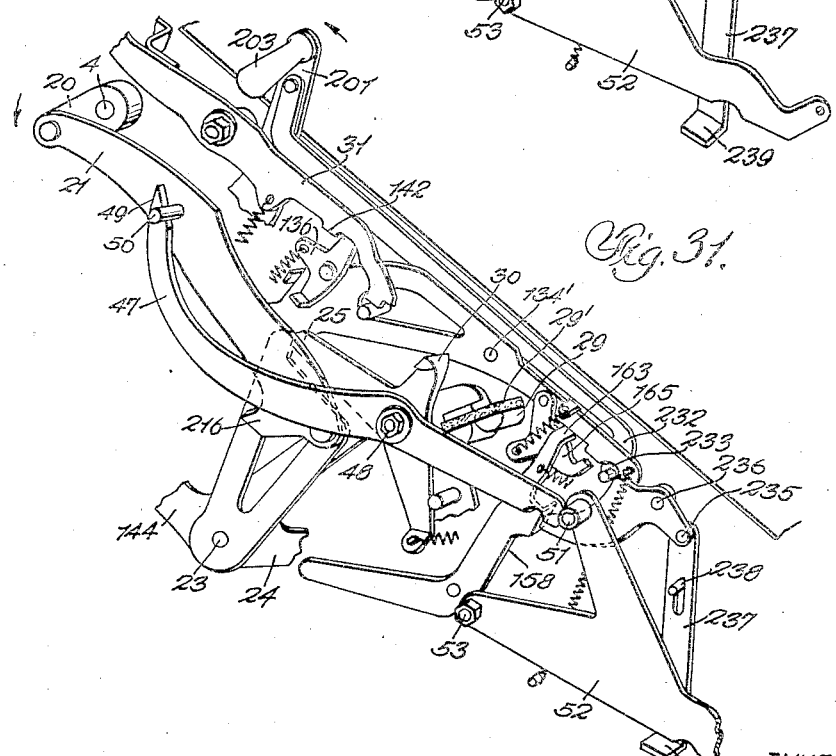
Figure 31 is a like view as Fig. 30, with parts in their final position at the end of additive movement, with parts in carriage shifting position.

Upon depression of add key 120 the train of parts 124, 125, 128, 111, will be rocked in a given direction and gear 105 held against rotation as shown in Fig. 7, while upon depression of subtract key 121 said parts are rocked in the opposite direction and gear 109 is held against rotation as shown in Fig. 8.

Figure 3:
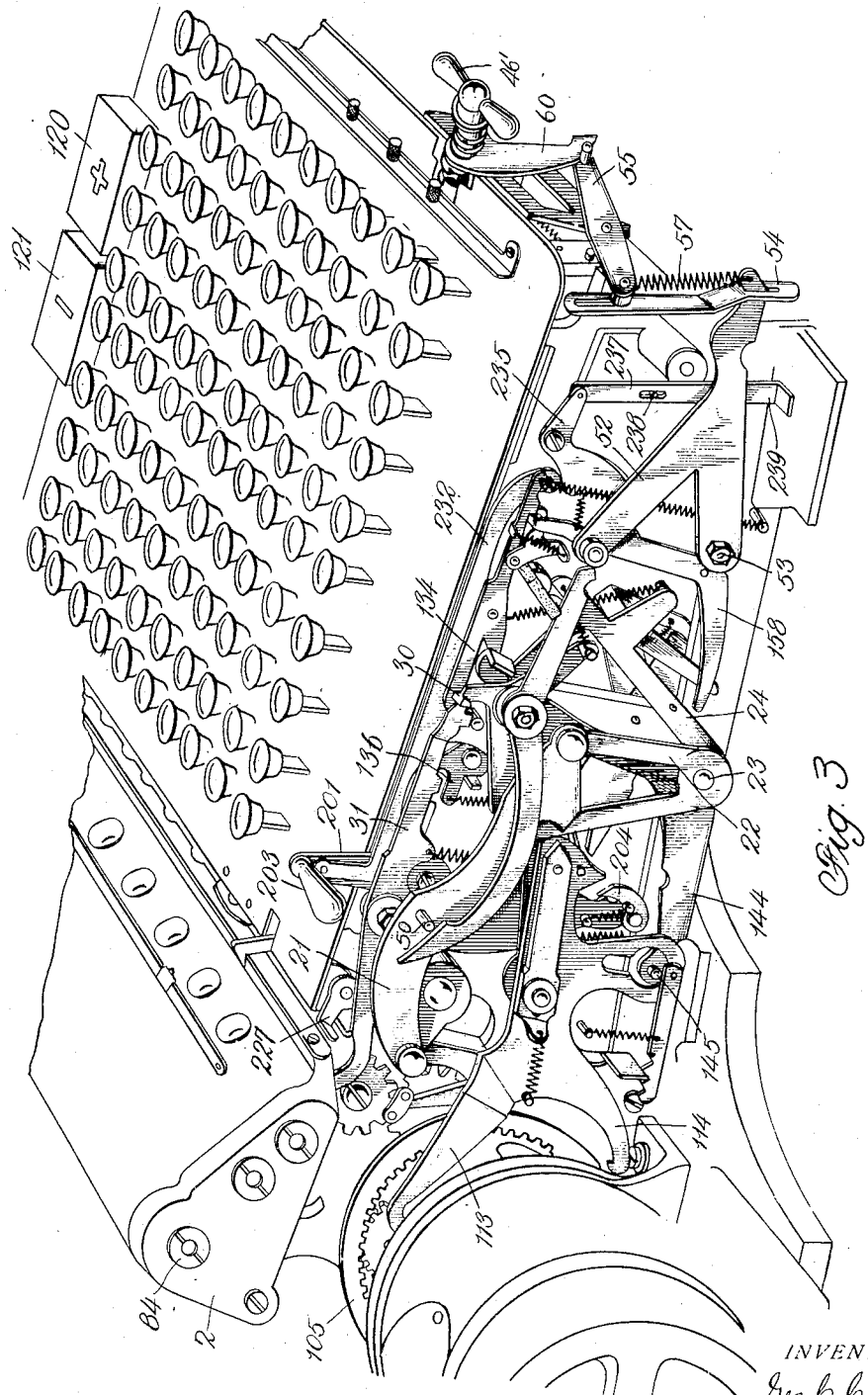
Figure 3 is a left side perspective view of the machine without the casing, showing all parts in normal position.

Division key (*Figures 3, 9 and 10*)

Division key lever 201 is fulcrumed to the framing at 202, the upper end of this key having handle knob 203 and the lower end thereof carrying pawl 204, pivoted at 205 and having spring 206 acting to hold the pawl in contact with stop 207. The forward arm of the reversing clutch lever 111 is provided at its free end with a cam edge portion or projection 208, with which the pawl 204 contacts during the setting movement of the division key, to adjust said reversing clutch lever from normal or neutral position shown in Fig. 9 to subtracting position, as shown in Figure 11, said pawl acting as a rigid part of the division key and passing sufficiently beyond said cam projection 208 to enable the reversing clutch lever 111 to take any one of its three positions without interferences from said pawl 204. The division key, having been operated as stated, remains in adjusted position until there is occasion to stop the operation of division, as will be explained.

Automatic reversing mechanism (*Figures 3 and 11 to 13 and 18 to 20*)

The reversing clutch lever having been moved to subtracting position, the machine will be started in operation and will continue to run in a subtractive direction until a transitional carry occurs, at which time the full-cycle stop mechanism described in Patent No. 1,544,806, is operated, as follows:

Crank arm 20, upon shaft 4, has link connection 21 with rock-lever 22. Arm 24 is pivoted at 23 and normally held in rearward position by spring 28, with a suitable lug thereof in contact with stop 29, and carries pivotal stop element 25, located in the plane of and normally held outside the path of movement of rock-lever 22, against the tension of its spring 26 by the action of spring 28 and engagement of lug 30 of the element with the end of a lever 31. Each numeral wheel is provided with a pin $q$, acting to initiate a carry to the next higher wheel in the usual manner, and the pin $q$ of the particular numeral wheel which may be in engagement with the cooperating carry member at the left-hand end of the carry mechanism will always be in position to contact with the double-beveled cam face 32 of the rear end of lever 31 as said numeral wheel passes to decimal position in a forward direction or from decimal position in a reverse direction. As a result, lever 31 will be operated against the tension of its spring 33 and its forward end will be raised out of engagement with lug 30 of element 25, whereupon said element, assisted by its spring, will drop into position to engage the free end 27 of the rock-lever 22 as the latter begins its next forward stroke. Arm 24 will now move forwardly, as a unit with rock-lever 22, until the momentum of the parts is absorbed or until the former engages with buffer 29' of stop 29, lug 30 of element 25 passing in the meantime from under the forward arm of lever 31, and allowing the latter to resume normal position, in the path of lug 30 of element 25. By this means forward movement of the machine is arrested with the parts at or near one extremity of the idle zone, reverse rotation being similarly arrested at the opposite extremity of the zone, with the link 21 upon the opposite side of its dead-center position.

Arm 24 of the full-cycle stop mechanism as herein provided for forms one arm of a lever the other arm 144 of which has at its free end stud 145, said stud in the forward movement of said arm 24 in effecting the stop engaging one of the cams 147 of the reversing clutch lever and thereby moving the latter to centralized or neutral position, said stud entering into the contracted portion 146 of the opening of said lever, the opposite cam edges of which are designated 147.

The machine being now momentarily declutched and arm 24 carried forwardly, spring 28 and the natural rebound of the mechanism will start the machine in operation in a reverse direction (additive), upon the first operation of the stop following the setting of the division key), and will restore arm 24 and element 25 to normal position. During or in this rebound the reversing clutch lever 111 will be actuated from neutral to additive position, to continue the reverse or additive rotation of the machine, as will now be described.

A pivoted, slidably adjustable member 209 is provided preferably formed as a tooth carried by the forward arm of reversing clutch lever 111. Tooth 209 has near its forward end a lateral stud 211 engaging a slot 211′ in the reversing clutch lever, being thereby supported at its forward end, the rear end of the tooth 209 having a slot 112′ engaged by the stud 112 upon which reversing clutch lever 111 is fulcrumed. A spring 210 tends to retract tooth 209. The stud 211 engages arcuate edge 212 of the division key 201, the arc of said edge centering at stud 112 when the division key is in its operating position as shown in Fig. 12. Upon the side of reversing clutch lever 111 opposite tooth 209 is provided a pawl 213, pivoted at 112 (fulcrum of said lever), the free end of said pawl being extended to overlie the stud 211 of tooth 209 and the spring 214 acting to maintain engagement of said free end of the pawl with said stud as shown in Fig. 10. The pawl 213 is provided with a notch 215, the shoulder 215′ of which will drop into engagement with stud 211 when tooth 209 is moved forwardly by contact of arcuate edge 212 of the division lever with stud 211 in the movement of the division key 201 to operating position, thereby locking said tooth 209 in forward position as shown in Fig. 12 until released by means to be described. Lost motion is provided for between the edge 212 of the division key and the stud 211, in order that the tooth 209 will not be moved forwardly until after the reversing clutch lever 111 has been thrown to subtracting position, thereby avoiding interference of said tooth with a projection 216 of link 21 of the full-cycle stop mechanism in the event that this projection happens to be in normal position when the division key 201 is operated or set as stated.

The reversing clutch lever 111 being in neutral position and the tooth 209 being locked in projected position as stated, the rebound of the full-cycle stop mechanism just referred to will cause the projection 216 of the link 21 of said mechanism to sweep downward and engage the forward end of the tooth 209 and thereby adjust the reversing clutch lever to additive position as shown in Fig. 13, this action taking place as crank arm 20 passes through its normal dead center position in a forward or additive direction. Similarly, the parts being in position as stated, as arm 20 passes through its normal dead center position in a rearward or subtractive direction, the projection 216 of link 21 will sweep upward, as shown in Fig. 11 and engage said tooth 209 and thereby adjust the reversing clutch lever 111 to subtractive position.

*Automatic carriage-shifting means (Figures 3 and 16–18*

It now becomes necessary to shift the carriage 2 one step to the left, in order to determine the second quotient figure in a similar manner. This stepping of the carriage occurs between cycles and during the time that the machine is operating within the limits of the idle zone. The means heretofore used for shifting the carriage transversely of the machine are disclosed in Reissue Patent No. 13,842, to F. S. Baldwin, and include a carriage-shifting shaft which is herein retained and numbered 46, and having a handle knob 46′. These parts formed a rigid unit and were given a half rotation counter-clockwise as viewed from the front of the machine, in order to step the carriage one step to the left. Means are herein provided for rotating said shaft 46 to move the carriage as stated, by the operation of arm 24 of the full-cycle stop mechanism following an additive registration, whenever division key 201 is in its operating position.

According to Patent No. 1,566,650, the initial forward movement of arm 24 is essentially concerned with retarding the released actuating mechanism, the release of the clutch by pin 145 occurring as quickly as possible after arm 24 has started forward so that this movement of the arm is dependent upon the inertia of said released mechanism. When, however, the initial forward movement of arm 24 is employed to shift the carriage, as in the present disclosure, greater and more constant power is required in this stroke, for which purpose the cam faces 147 of lever 111 are arranged to lie a little above the normal position of pin 145, so that arm 24 will be given a degree of movement before said pin strikes the cam face and releases the clutch. Consequently, the first portion of the carriage-shifting impulse will be derived directly from the motor, this direct impulse being continued long enough to insure the shifting.

Push rod 47 is pivoted on arm 24 at 48, and has a rear cam face 49 engaging with pin 50, the latter mounted on link 21. The forward end of push rod 47 is adapted to push forwardly against roller 51, mounted on bell-lever 52, buffer 29' being laterally extended to prevent said forward end from rising above said roller. Lever 52 is fulcrumed at 53 to the framing and at its forward end engages a slot 54' at the lower end of a link 54, the upper end of this link have a slot 55' which engages (slidably) one arm of the carriage-shifting lever 55, the latter fulcrumed to the framing at 56. The forward end of the bell-lever 52 has connected thereto a coiled spring 57, the upper end of said spring connecting with the free end of the same arm of the carriage-shifting lever 55 engaged by said link, the spring acting to hold the bell-lever 52 and the carriage-shifting lever 55 normally as closely together as the slotted link 54 will permit.

The other or right-hand arm of the carriage-shifting lever 55 is provided at its free end with a roller 58, adapted to operate against carriage-shifting cam 60, the latter being loosely mounted on shaft 46 and having a toothed hub clutch member 61 adapted for engagement with the teeth of the complementary clutch member 63, fast upon shaft 46, a coiled spring 64 upon shaft 46 tending to press cam 60 and its clutch hub toward clutch member 63. A plate 65 has its lower edge pivoted to the framing at 65' and at its upper edge engages the hub of the cam 60. The division key is provided with a connecting rod (clutch locator) 217, between the same and the pivot plate 65, and means are provided (to be explained) whereby when the division key is in normal position said plate 65 will be maintained in position to hold the clutch members 61 and 63 out of engagement, with the spring 64 under tension. When the division key is moved to operating position, the spring 64 will effect the clutch of the members 61 and 63 as shown in Fig. 18, so that rotation of the cam 60 will also rotate the carriage shifting shaft 46.

*Operation of carriage-shifting mechanism (Figures 19 and 20)*

During the movement of the arm 24 of the full-cycle stop mechanism from normal position toward buffer device 29' at the end of an additive operation, pin 50 of link 21 encounters cam end 49 of the push rod and thereby holds the forward end of the push rod against roller 51 of the bell-lever 52, this movement of arm 24 at the conclusion of additive operations moving the push rod 47 bodily therewith and rotating bell-lever 52 on its fulcrum 53 and exerting tension upon one end of the spring 57. The other end of this spring being connected to the carriage-shifting lever 55, the latter will be operated as a consequence of the elongation or tensioning of the spring. The link 54 acts to limit the movement of the carriage-shifting lever and the bell-lever toward each other, and the spring 57 is normally tensioned, tending to move these parts toward each other. The spring 57 in its elongation as stated absorbs or stores energy and utilizes this energy more slowly in its operation of the carriage-shifting lever 55. As the roller 58 of the carriage-shifting lever is carried upward in the operation of said lever, the cam 60 is rotated counter-clockwise as viewed in Figure 19, thereby raising the carriage and advancing it about one-half of its step movement (or 90°) to the left. The momentum of the carriage and the force of gravity acting thereon is sufficient to complete its one step of movement.

The clutch member 63 of the carriage-shifting shaft is rotated one-half rotation in the shifting of the carriage as stated, and the teeth of the clutch member 61 of the cam 60 are rotated only one-quarter rotation, this being permitted by compression of the spring 64 by the action of the clutch member 63 so that its teeth may slide over the teeth of the clutch member 61. In this way the complete one-step shifting of the carriage is accomplished after the 90° driving action of the cam 60 has ended.

During the conclusion of subtractive operations the push rod 47 is similarly carried along with the arm 24, but its forward end will slide under the roller 51 of the bell-lever 52 and will not actuate said bell-lever, this being due to the fact that the link 21 takes a position during the conclusion of subtractive operations that is higher than the position taken during the conclusion of addition operations (see Figure 20), thereby permitting the rear end of the push rod to rise as its forward end is engaged with and slides under roller 51 as stated, the push rod movement being idle. The forward end of the push rod is inclined sufficiently so that its engagement with the roller 51 is in the nature of a cam engagement, to cam the forward end of said push rod below said roller 51 as the push rod is carried along with the arm 24.

When the division key is restored to normal position the connecting rod (clutch locator) 217 will act to disengage clutch member 61 from clutch member 63, preventing any further movement of the carriage by the automatic shifting means (see Fig. 17).

*Manual means for stopping automatic division operations (Figs. 14 and 15)*

The division key 201 having been moved to operating position, is adapted to be returned at any time to normal position, to permit the retraction of tooth 209. It is evident that when tooth 209 is retracted, a transitional carry will operate to stop the machine, rather than to reverse the operation, since reversing clutch lever 111 will be left in neutral position, as moved by releasing stud 145 of arm 24 during the operation of the full-cycle stop means. Means are provided, however, to be now described, whereby the machine will continue in operation until the quotient figure being computed is correctly registered, after the division key is returned to normal position.

The pawl 204 is adapted to yield pivotally and pass beneath cam 208 of the reversing clutch lever in the return movement of the division key.

The division key is provided with a pin 219 (division stopping pin), a short distance above the pawl 204 of said key, said pin normally underlying the lower edge 220 of the pawl 213 and being spaced from said lower edge sufficiently that in the movement of the division key from normal to operating position pawl 213 may drop and bring the shoulder 215' of its notch 215 into engagement with the stud 211 of lever 111, thereby locking the slidable tooth 209 in its forward position, as previously stated. When, however, the reversing clutch lever 111 is moving to adding position, pawl 213 moves downwardly therewith, but if the division key 201 is in normal position the pin 219 (division stopping pin) thereof will engage the lower edge 220 of the pawl 213 and lift said pawl from engagement with the stud 211, whereupon the slidable tooth 209 will be at once retracted by its spring to normal position, out of the path of the cam projection 216 of the link 21, thereby assuring the stoppage of the machine as stated (see Fig. 14).

During the time that division key 201 was operatively positioned, pawl 213 of the reversing clutch lever was in position locking the slidable tooth 209 in forward moved position, and the pin 219 was located beneath a cut-out portion 221 of the lower edge 220 of pawl 213. If the return movement of the division key from operating to normal position is accomplished during the time that the reversing clutch lever 111 is standing in its additive position, a cam part 222 of said lower edge 220 of the pawl 213 is engaged by pin 219 and the pawl is thereby raised from its locking position (engaged with stud 211) and slidable tooth 209 is returned to retracted position by its spring, thereby as previously explained assuring the stopping of the machine at the end of the additive registration (see Fig. 15A).

*Automatic stopping of division operations (Figs. 14 and 15)*

It is desirable to automatically discontinue the operation of division when the capacity of the machine has been reached, this occurring when the carriage has been shifted to its extreme left-hand position and a quotient has been registered on the right-hand quotient numeral wheel 85. This automatic stop is the usual means relied upon to conclude a calculation of division, rather than the manual restoration of the division key to normal. The operator usually positions the carriage 2 so as to provide for the needed number of digits in the quotient before starting the calculation, and then allows the machine to run to its remaining capacity. The automatic stopping is accomplished merely by the automatic restoration of the division key to normal position by the final movement of the carriage 2, into its extreme left-hand position. From the previous description it is evident that if the division key is so restored as soon as the carriage 2 makes its final step, the machine will continue its operation until the final quotient figure, that is to say the figure to be calculated in this position, will have been correctly registered on the right-hand quotient numeral wheel.

For the purpose, then, of automatically stopping the operation of division, a lever 223 is fulcrumed to the framing at 224, the forward arm 225 of this lever being adapted to engage the lower side of a lug 226 of the division key 201. The forward arm 225 of lever 223 has another function, which will be presently stated. The rear arm 227 of lever 223 is provided with a bent lug 227', adapted for engagement with the lower edge of lug 228, located forwardly upon the carriage 2, a spring 229 of lever 223 tending to impel the rear arm 227 of said lever upwardly.

The division key being in normal position, there is clearance space between the lug 226 thereof and the forward arm 225 of lever 223, but when the division key is in operative position this clearance space is closed up. The carriage 2, being hinged in rear and endwise-shiftable transversely of the machine, will as it is shifted toward the left, step by step, by the means aforesaid, cause the lug 228 located forwardly upon the carriage to move therewith in a series of steps which are approximately semicircular, as will be apparent from the disclosure of the Reissue Patent No. 13,842, and as the carriage takes its final step to the left said lug 228 engages the bent lug 227' of the rear arm 227 of lever 223, said arm being thereby moved downwardly and the forward arm of said lever being moved upwardly to engage the under side of the lug 226 of the division key and restore said key to normal position, arresting the operation of the machine (see Fig. 14).

*Means for maintaining the division key in normal or in operating position (Figs. 9, 11, 13 and 14)*

Reference has previously been made to the aforesaid means, which is shown as a part of the lever 223 (automatic stopping lever). The division key is provided with a pin 230 which cooperates with the double cam face 231 at the forward extremity of arm 225 of said lever, the spring 229 of said lever acting to maintain one or the other of the cam faces 231 thereof against one or the other of the cam or inclined faces of said pin, so that any movement of the division key from normal to operating position or vice versa will cause a movement of said lever against the tension of said spring, the latter affording a sufficient resistance to maintain the division key in position, as stated. When the carriage 2 is in any position other than extreme left-hand position, the aforesaid lever 223 serves only to maintain the division key in position.

*Means for retarding the rebound of the parts (Figs. 3 and 21–34)*

At the conclusion of a problem the machine must be brought to rest with the actuating mechanism located in full-cycle position, and while the full-cycle stop mechanism previously described interrupts the forward movement, the rebound of the actuating mechanism, combined with the reaction of spring 28, tends to throw this mechanism out of the zone of idle movement, which includes said full-cycle position. In order to prevent this, means are employed which will be explained first in connection with the means for concluding an operation initiated by the add or the subtract key.

Setting lever 128 is provided with cam edges 131, 132, either of which may depress a roller 133 mounted upon the rear end of releasing lever 134, fulcrumed at 134' to the framing. Upon the rear end of the releasing lever is pivotally mounted releasing pawl 136, impelled by spring 138 toward stopping lug 139 of said lever. Upon depression of the add or the subtract key, lug 141 of pawl 136 will be depressed to a position lower than lug 142 of lever 31, whereupon spring 138 will move said pawl pivotally to bring lug 141 to position beneath lug 142 (see Fig. 23). Upon release of the key, releasing lever 134 will be moved by its spring to raise pawl 136, whereupon the contact of lug 141 with lug 142 will raise the forward end of lever 31 and trip stop element 25, to stop the machine at full-cycle position (see Fig. 25). Means are provided to prevent lug 141 of pawl 136 from tripping beneath lug 142 of lever 31 if the latter is raised, through the action of a transitional carry, when the division lever is in operative position. To this end stop 143 is fastened to the frame and normally holds lug 141 of lever 136 a short distance away from lug 142 of lever 31 (see Fig. 21).

Arm 24 of the stop mechanism is provided at its upper end with a laterally yieldable spring tooth 149, normally abutting against lug 148 of releasing pawl 136. Upon depression of pawl 136, consequent upon depression of the add or the subtract key, lug 148 will move downwardly past tooth 149 and spring 138, moving said pawl, will bring lug 148 beneath tooth 149 (see Fig. 23). Upon release of the key, pawl 136 will rise and its lug 148 will raise tooth 149 against the tension of its spring (see Fig. 25), in which position it will remain until arm 24 is carried forward, against stop 29 in the operation of the stopping means, when tooth 149 will be released and will resume a position in line with lug 148 (see Fig. 27). In the rebound of the parts following contact of arm 24 with stop 29, the lug 30 of stop element 25 will pass below the forward end of lever 31, the latter being held in raised position by releasing pawl 136. Tooth 149 will now contact with lug 148 and move the releasing pawl to bring its lug 141 from beneath lug 142, whereupon the releasing pawl will be raised by the releasing lever spring to normal position, and lever 31 will fall and rest upon lug 30 (see Fig. 28). Stop element 25 has thus been allowed to remain in contact with rock-lever 22, and link 21 moving through dead center position, the parts will be stopped a second time, should the rebound thereof be sufficient (see Fig. 29), following which stop element 25 will be restored to normal restrained position by contact of lug 30 thereof with the end of lever 31, as in Fig. 21.

Releasing pawl 136 is brought into action to provide for a second operation of the stop means at the conclusion of an automatic divisional operation by the following means:

A bar 232 operated by and pivoted to the division key lever 201 is provided at its free end with a pin 233 which, in normal inoperative position of the division key is interposed between cam extension 234 of one arm of bell-lever 235 and the forward end of the releasing lever 134. Lever 235 is fulcrumed to the framing at 236 and the other arm thereof has pivoted thereto a depending bar 237 having guide pin and slot connection with the framing at 238 and at its lower end having a lug 239 underlying bell-lever 52.

It will be recalled that bell-lever 52 is depressed by push rod 47 at the conclusion of an additive registration simultaneously with the movement of arm 24 toward stop 29, and in this depression said bell-lever will contact with lug 239 of bar 237 and thereby rock bell-lever 235 and raise pin 233. When the division key is pushed rearwardly to operative position, the pin 233 carried by bar 232, connected to the division key, will be moved therewith from active interposed position between bell-lever 235 and the releasing lever, so that operation of lever 235 as stated will be idle (see Fig. 31). When, however, the division key is in normal inoperative position, the pin 233, being in active interposed position between bell-lever 235 and the releasing lever, the movement of bell-lever 52 will be transmitted to releasing lever 134, depressing releasing pawl 136 so that the lug 141 thereof will engage beneath lug 142 of the lever 31. As the arm 24 moves away from stop 29 in the rebound of the parts, bell-lever 52 will be retracted by spring 57, thereby releasing lug 239 of bar 237 and permitting releasing pawl 136 to rise, under the influence of the releasing lever springs (to be described) and lift the forward end of lever 31 from the path of lug 30 of element 25, the action of the parts being the same as that described as following the release of the add or subtract key (see Fig. 33).

Referring to the action of the releasing lever springs, it has been set forth in Patent No. 1,566,650, that the tension spring 135 is made inadequate to provide for certainty of operation of releasing-lever 134 to raise the forward end of lever 31, and that spring 167 has been provided to reinforce the action of spring 135 at the proper time. This spring 167 is attached to releasing lever 134, and at the other end to a sub-lever 165 (see Fig. 23). Lever 158 pivoted to the framing, and having its upper arm spring impelled toward the front of the machine, is provided with a lug 163 which is intended to climb cam-edge 165' formed on sub-lever 165, and draw the sub-lever downward, thereby placing spring 167 under tension, to reinforce spring 135. A lug 158' provided on lever 158 will be engaged by the lower end of bell-lever 235 whenever the latter is operated (see Fig. 33), whereby said lever will be operated and spring 167 tensioned whenever the machine is to be brought to rest by the action of releasing-lever 134 at the termination of a division calculation.

In addition to this second positive stop, movement of the actuating mechanism when released from the motor drive is retarded by the train of mechanism consisting of bell-lever 52, link 54, spring 57, carriage-shifting lever 55, cam 60 and spring 60', of which there is idle operation at the conclusion of a problem of division, this retardation aiding materially in preventing the mechanism from rebounding out of idle position. This action is due mainly to the elongation of spring 57, which is caused first by the movement of lever 52 as a whole or bodily away from the carriage-shifting lever, and further by operation of these levers upon their fulcrums, the spring 57 acting also to restore the parts to normal position.

Secondary means are provided for withholding the mechanism within the limits of the idle zone, consisting of cam 153 upon carry shaft 154 and acted upon by lever 155, spring 156 and roller 157, see Fig. 34, all as described in the before-mentioned patent of George C. Chase, No. 1,566,650, for operating means for calculators, said parts not only checking the second rebound but also retarding the first rebound, and thus diminishing the force of the second rebound.

Registration of the quotient

In "tear down" division the net number of times that the amount set up on the keyboard is subtracted from the amount registered upon the numeral wheels 13 corresponds to the number of rotations of the actuating mechanism of the machine, and mechanism is provided to count the number of such rotations made during the time that the carriage 2 is in each ordinal position, and to register the same as a quotient. In "built up" division the net number of times the keyboard value is added into the numeral wheels should be registered as a quotient.

Any quotient mechanism of reversible type may be employed for this purpose, as for instance those disclosed in Patents 1,468,992 and 1,504,741, to George C. Chase, or that illustrated herein, which is of well known form, substantially equivalent to the disclosures of the Baldwin Reissue Patent No. 13,841.

According to the present disclosure the counting wheels 85 are supported upon a shaft 84, mounted in carriage 2, each wheel being marked upon its periphery with the digits from zero to nine and from nine to one in a double reverse series, intended to register respectively the quotient in division and the multiplier in multiplication. The wheels 85 are operated individually, one step in forward or reverse direction, according to the direction of rotation of carry shaft 154, by means of a pawl 86, driven by a cam 88 upon said shaft and working within a slot of said pawl. The pawl is guided by pin and slot means 90 so that the operating end thereof will be moved in a rectangular path, to engage and move the gear 89 of a wheel 85 one step for each rotation of shaft 154. Movement of the carriage 2 one step to the right or left will bring an adjacent wheel 85 into position to be operated by pawl 86, the movement of the carriage in the latter direction providing for the registration of the next lower figure of the quotient.

The quotient mechanism above described and shown in the accompanying drawings, has been referred to because of its simplicity. The specific mechanism forms no part of the present invention, and the beforementioned quotient registering mechanism of Patent #1,504,741, as extensively commercialized in machines constructed in accordance with this disclosure, may be used. The quotient registering mechanism of said patent provides for 10's carry mechanism between the quotient wheels, and facilitates the use of the well known "short cut" methods of operation in "built up" division, whereby the number of cycles of operation are reduced by combination of subtractive and additive registrations, to effect a final net additive registration corresponding to the quotient.

Sequence of operative movements (full automatic division)

Reversing clutch lever 111 is moved into subtract position to start the machine by pawl 204 of the division key engaging cam projection 208 of said lever in the movement of said key from normal to operative position. Simultaneously with the movement of lever 111 to subtracting position, the edge 212 of the division key engages stud 211 of slidable tooth 209 and moves said tooth outwardly, whereupon pawl 213 falls in behind said stud and locks tooth 209 in forward moved position. The numeral wheels 13 are now rotated in a subtractive direction until a transitional carry occurs, and the number of rotations of the actuating means is registered upon a quotient wheel 85.

In the action of the full-cycle stop means consequent upon the transitional carry, pin 145 of arm 24 engages cam edge 147 of lever 111 and returns said lever to normal position, and in the further action of the full-cycle stop means cam projection 216 of the link 21 engages tooth 209, in the downward sweep of 216, and moves lever 111 into add position. The numeral wheels 13 are now rotated in an additive direction, and a second transitional carry will follow the first rotation of the actuating means, the reverse registration upon the wheel 85 correcting the quotient figure.

In the succeeding action of the full-cycle stop means pin 145 of arm 24 engages cam edge 147 of lever 111 and returns said lever to normal position, and in the further action of the full-cycle stop means cam projection 216 of arm 21 engages tooth 209, in the upward sweep of 216, and moves lever 111 to subtract position. Simultaneously with the return of lever 111 to normal position, push rod 47 is carried forwardly with arm 24, being held in operative position by pin 50 of link 21, and, through the train of mechanism previously described, shifts carriage 2 one step to the left, the operation now proceeding as before in the calculation of the second figure of the quotient.

Restoration of division key 201 to normal position, either by hand or by the action of lug 228 of the carriage 2, will permit the retraction of tooth 209 as the clutch is next brought into additive engagement, so that the succeeding operation of the full-cycle stopping means will leave the reversing clutch lever 111 as moved thereby to neutral position, and the machine will be brought to rest.

I claim:

1. In a calculating machine, numeral wheels, reversible actuating means therefor, driving means including a motor, clutch means operable to effect transmission of movement from said driving means to said actuating means, means for arresting the actuating means upon release of the clutch, operable to prevent further movement of said actuating means in the original direction only, means operable to modify the action of said arresting means to prevent effective movement of the released actuating means in either direction, and means for automatically releasing the arresting means.

2. In a calculating machine, numeral wheels, reversible actuating means therefor, driving means for said actuating means including a motor, means controlled by the numeral wheels for retarding and thereafter arresting the forward movement of the actuating means and for reversing the operation thereof, and means for modifying the action of the arresting means to retard and thereafter to bring the actuating means to rest.

3. In a calculating machine, numeral wheels, reversible actuating means therefor, driving means for said actuating means including a motor, and means for arresting the actuating means, operable to prevent movement thereof in one direction only in reversing the actuating means, and to prevent effective movement in either direction in bringing the actuating means to rest in full-cycle position.

4. In a calculating machine, numeral wheels, reversible actuating means therefor, driving means for the actuating means including a motor, means for arresting the actuating means in either of two angular positions, operable to prevent further movement of said actuating means in the original direction only, and means operable to modify the action of said arresting means to arrest the actuating means successively in the one and in the other angular position and thus prevent effective movement of the actuating means in either direction.

5. In a calculating machine, numeral wheels, reversible actuating means therefor, driving means for the actuating means including a motor, means for arresting the actuating means in either of two angular positions, operable to prevent further movement of said actuating means in the original direction only, and means operable to modify the action of said arresting means to arrest the actuating means successively in the one and in the other angular position and thus prevent effective movement of the actuating means in either direction, said arresting means including a device operable to retard the actuating means previous to the arresting action and finally to bring the actuating means to rest in a normal position intermediate such arrested position.

6. In a calculating machine, numeral wheels, reversible rotary actuating means therefor, motor driving means for said actuating means, means controlled by said numeral wheels for stopping said actuating means in full-cycle position, and an operation member settable to modify the action of said stopping means to reverse the direction of rotation of said actuating means and manually retractible at any time to permit the stopping action thereof.

7. In a calculating machine, numeral wheels, reversible rotary actuating means therefor, motor driving means for said actuating means, means controlled by said numeral wheels for stopping said actuating means in full-cycle position, and an operation member settable to modify the action of said stopping means to reverse the direction of rotation of said actuating means and automatically retractible at the end of a predetermined number of cycles of operation to permit the stopping action thereof.

8. In a calculating machine, numeral wheels, means for rotating said wheels including a motor, selecting mechanism, means for automatically dividing an amount registered upon said wheels by an amount set up by said selecting mechanism upon operation by said motor, including means manually adjustable to a uniform position at any stage of an operation and adapted thereupon to stop the operation at the completion of any initiated quotient figure registration.

9. In a calculating machine, numeral wheels, means for rotating said wheels including a motor, selecting mechanism, means for automatically dividing an amount registered upon said wheels by an amount set up by said selecting mechanism upon operation by said motor, including a device manually settable to initiate the operation and manually retractible at any stage of an operation and adapted thereupon to stop the same at the next completion of a quotient figure registration.

10. In a calculating machine, numeral wheels, means for rotating said wheels including a motor, selecting mechanism, means for automatically dividing an amount registered upon said wheels by an amount set up by said selecting mechanism upon operation by said motor, including a device manually adjustable at any stage of an operation and adapted thereupon to stop the operation at the completion of any initiated quotient figure registration, and means for adjusting said device automatically when the machine has reached the limit of its capacity.

11. In a calculating machine, numeral wheels, reversible actuating means therefor, means for driving said actuating means in either direction including a motor, and means for reversing the drive of said actuating means, including means for arresting the forward movement of said actuating means, the parts being adapted to cause the rebound of the actuating means following such arrest to merge with the reversely driven movement thereof.

12. In a calculating machine, numeral wheels, reversible actuating means therefor, means for driving said actuating means in either direction including a motor, means for arresting the forward movement of said actuating means, and means for reversing the drive of said actuating means, operable by the rebound of said actuating means following such arrest.

13. In a calculating machine, numeral wheels, reversible actuating means therefor, driving means for the actuating means including a motor, means reversible to determine the direction of movement transmitted from said driving means to said actuating means, and means adapted to arrest the actuating means in either of two angular positions, according to the direction of movement and to reverse said direction determining means by movement of said actuating means from the one or the other arrested position.

14. In a calculating machine, numeral wheels, reversible actuating means therefor, means for rotating said actuating means in either direction including a motor and a reversible clutch, and means adapted to arrest the actuating means in either of two angular positions, according to the direction of rotation and to reverse said clutch by movement of said actuating means from the one or the other arrested position.

15. In a calculating machine, numeral wheels, reversible actuating means therefor, means for rotating said actuating means in either direction including a motor and a reversible clutch, means for releasing the clutch, and means for arresting the forward movement of said actuating means upon release of the clutch and for reeffecting the clutch, adapted to arrest the actuating means in either of two angular positions, according to the direction of rotation, and to reverse said clutch by movement of said actuating means from the one or the other arrested position.

16. In a calculating machine, numeral wheels, reversible actuating means for said wheels comprising rotary elements, driving means for said actuating means including a motor, and means including an oscillatory member, driven by one of said rotary elements, for arresting the forward movement of the actuating means and thereafter reversing the direction of rotation of said means.

17. In a calculating machine, numeral wheels, reversible actuating means for said wheels comprising rotary elements, driving means for the actuating means including a motor, means reversible to determine the direction of movement transmitted from said driving means to said actuating means, and means including an oscillatory member, driven by one of said rotary elements, adapted to arrest the actuating means in either of two angular positions, according to the direction of rotation, and to reverse said direction determining means by movement of said actuating means from the one or the other arrested position.

18. In a calculating machine, numeral wheels, reversible actuating means therefor comprising rotary elements, driving means for said actuating means including a motor, means reversible to determine the direction of movement transmitted from said driving means to said actuating means, and means including an oscillatory member and a rod connecting said member with one of said rotary elements, adapted to arrest the actuating means in either of two angular positions, with the connecting rod beyond dead-center position, and to reverse said direction determining means by contact therewith of the connecting rod in the movement of said rod in either direction to dead-center position.

19. In a calculating machine, numeral wheels, reversible actuating means therefor comprising rotary elements, driving means for said actuating means including a motor and reversible clutch means including a pivoted clutch-operating member settable to determine the direction of movement transmitted from the driving means to the actuating means, and means including an oscillatory member and a rod connecting said member with one of said rotary elements, adapted to arrest the actuating means in either of two angular positions, with the connecting rod beyond dead-center position, and to reverse said pivoted member by contact therewith of the connecting rod in the movement of said rod in either direction to dead-center position.

20. Operating mechanism for the numeral wheel actuating means of calculating machines, comprising driving means including a motor, clutch means operable to effect transmission of movement from said driving means to said actuating means, means for automatically releasing the clutch, and means operable by the momentum of the released actuating means to reeffect the clutch.

21. Operating mechanism for the numeral wheel actuating means of calculating machines, comprising driving means including a motor, clutch means operable to effect transmission of movement from said driving means to said actuating means, means for automatically releasing the clutch, means for arresting the forward movement of said actuating means, and means operable by the rebound of the actuating means following such arrest to reeffect the clutch.

22. Operating mechanism for the numeral wheel actuating means of calculating machines, comprising driving means including a motor, clutch means operable to effect transmission of movement from said driving means to said actuating means, means for automatically releasing the clutch, means for arresting the forward movement of said actuating means, means operable by the rebound of the actuating means following such arrest to restore the arresting means to inactive position, and means operable by said rebound to reeffect the clutch.

23. In a calculating machine, numeral wheels, reversible actuating means therefor comprising rotary elements, driving means including a motor, clutch means operable to effect transmission of movement from said driving means to said actuating means, and means for effecting said clutch and automatically performing a mathematical operation embracing a plurality of partial operations, including means provided with an oscillatory member driven by one of said rotary elements, for automatically effecting and releasing said clutch to initiate and determine the extent of each partial operation.

24. In a calculating machine, reversible numeral wheels, means for rotating said wheels in either direction including digit selecting actuator elements, a motor, oppositely rotating differential gear elements and a clutch member engageable with either of said elements, and means including devices for arresting forward movement of the actuator elements and members operable by the rebound of said actuator elements following such arrest for shifting said clutch member out of engagement with one gear element and into engagement with the other gear element, to reverse the direction of rotation of said wheels.

25. In a calculating machine, a transversely shiftable carriage, numeral wheels mounted thereon, actuating means for said wheels and means including a quick stroke lever device operable by said actuating means and a spring energized by said lever and adapted thereupon to shift the carriage transversely.

26. In a calculating machine, a transversely shiftable carriage, numeral wheels mounted thereon, actuating means for said wheels, driving means including a motor, clutch means operable to transmit movement from said driving means to said actuating means, control means comprising automatic clutch releasing elements and a member settable to active position and actuated by the released actuating means to reeffect the clutch and to shift the carriage.

27. In a calculating machine having a transversely shiftable carriage, numeral wheels mounted thereon, actuating means for said wheels, driving means for said actuating means including a motor, clutch means operable to transmit movement from said motor to said actuating means, and means for releasing said clutch, means for shifting the carriage transversely, including transmission members driven by said actuating means, and means for operating the releasing means before the completion of a shifting operation, whereby the inertia of the carriage will function as a momentum check for the released actuating means.

28. In a calculating machine, a transversely shiftable carriage, numeral wheels mounted thereon, actuating means for said wheels comprising rotary elements, driving means for said actuating means including a motor, clutch means operable to transmit movement from said motor to said actuating means, means for releasing said clutch, means including an oscillatory member, driven by one of said rotary elements, for shifting said carriage transversely, and a spring holding said member tensioned in normal position and acting as a momentum check for the released actuating means.

29. In a calculating machine, a transversely shiftable carriage, numeral wheels mounted thereon, actuating means for said wheels comprising rotary elements, and means including an oscillatory member, driven by one of said rotary elements, a quick stroke lever device operable by said member, and a spring energized by said device and adapted thereupon to shift said carriage transversely.

30. In a calculating machine, a transversely shiftable carriage, numeral wheels mounted thereon, reversible actuating means for said wheels, means including a lever operable to stop the actuating means in either of two angular positions, and means cooperating with said lever in the movement of the actuating means to one stopping position only, to shift the carriage transversely.

31. In a calculating machine having a transversely shiftable carriage, numeral wheels mounted thereon, actuating means for said wheels, driving means for said actuating means including a motor, clutch means operable to transmit movement from said motor to said actuating means, and means for releasing said clutch; carriage shifting means including power transmission elements adapted for operation by the momentum of the released actuating means.

32. In a calculating machine having a transversely shiftable carriage, numeral wheels mounted thereon, actuating means for said wheels, driving means for said actuating means including a motor, clutch means operable to transmit movement from said motor to said actuating means, and means for releasing said clutch; carriage shifting means operable first directly by said motor and after the release of the clutch by the momentum of the released actuating means.

33. In a calculating machine having a transversely shiftable carriage, numeral wheels mounted thereon, actuating means for said wheels, driving means for said actuating means including a motor, clutch means operable to transmit movement from said motor to said actuating means, and means for releasing said clutch; carriage shifting means operable first directly by said motor, after the release of the clutch by the momentum of the released actuating means, and finally by the momentum of the carriage alone.

34. In a motor driven calculating machine, having means for registering repeated cycles of positive or negative operation; stopping and reversing means, including a normally inactive control member, means for intermittently imparting a uniform movement to said member, means for utilizing said movement to stop the machine, and alternative means for utilizing said movement to reverse the operation to the opposite sign.

35. In a motor driven calculating machine having reversible numeral wheels, selecting mechanism, and means for shifting said wheels and selecting mechanism relatively to each other; stopping and reversing means, including a normally inactive control member, means for intermittently imparting a uniform movement to said member, means for utilizing said movement to stop the machine, and alternative means for utilizing said movement to reverse the numeral wheels and to effect the shifting movement between said wheels and selecting mechanism.

36. In a motor driving calculating machine having reversible numeral wheels, selecting mechanism, and means for shifting said wheels and selecting mechanism relatively to each other, stopping and reversing means, including a normally inactive control member, means for intermittently imparting a uniform movement to said member, means for utilizing said movement to stop the machine, and alternative means selectively operable to utilize said movement to reverse the numeral wheels and/or to shift said wheels and the selecting mechanism relatively to each other.

37. In a calculating machine having a transversely shiftable carriage, numeral wheels thereon and actuators for said wheels; control means comprising devices for stopping the actuators and devices for shifting the carriage and including a member adapted by a uniform movement to effect the stop and a member operable to transmit said uniform movement as selective movement to determine the position of the carriage.

38. In a calculating machine having a transversely shiftable carriage, numeral wheels thereon, actuators for said wheels, a motor, and a clutch between said motor and said actuators; control means comprising devices for releasing the clutch and devices for shifting the carriage and including a member adapted by a uniform movement to effect the release and a member operable to transmit said uniform movement as selective movement to determine the position of the carriage.

39. In a calculating machine having a transversely shiftable carriage, reversible numeral wheels thereon, motor driven differential actuators, and devices settable to determine positive or negative registration; control means comprising devices for restoring the direction determining devices to neutral and for shifting the carriage and including a member adapted by a uniform movement to effect the restoration and a member operable to transmit said uniform movement as selective movement to determine the position of the carriage.

40. In a calculating machine having a transversely shiftable carriage, numeral wheels thereon, means for rotating said wheels including a motor, carriage shifting means, and selecting mechanism; means for automatically dividing an amount registered upon said wheels by an amount set up by said selecting mechanism upon operation by said motor, including registering and carriage shift control devices, and a device manually adjustable at any stage of an operation and adapted thereupon to disable the carriage shifting means and thereafter to stop said operation, upon the next completion of a quotient figure registration.

41. In a calculating machine having a transversely shiftable carriage, reversible numeral wheels thereon, actuators for said wheels including reversible members, driving means for said actuators including a one-way motor, a clutch between said motor and said actuators, and selecting mechanism; means for dividing an amount registered upon said wheels by an amount set up by said selecting mechanism, including actuator reversing and carriage shifting devices operable by said reversible members, means for setting said devices to active position and for engaging the clutch, and means operable by a numeral wheel to control the action of said devices.

42. In a calculating machine, reversible numeral wheels, actuators therefor having a reversible cycle of operation comprising a plus tens carry phase, and ordinal registration phase and a minus tens carry phase, and means for driving the actuators; means for automatically reversing the direction of movement of said actuators to reverse the order of succession of the cycle phases, including members operable after the completion of a cycle in either direction to effect the reversal.

43. In a calculating machine, reversible numeral wheels, actuators therefor having a reversible cycle of operation comprising a plus tens carry phase, an ordinal registration phase, a minus tens carry phase and a single full-cycle point, and means for driving the actuators; means for automatically reversing the direction of movement of said actuators in either direction to reverse the order of succession of the cyclic phases, including members having an extra-cyclic operation and adapted to effect a resumption of the cyclic operation of the actuators from the full cycle point.

44. In a calculating machine, reversible numeral wheels, actuators therefor having a reversible cycle of operation comprising a plus tens carry phase, an ordinal registration phase and a minus tens carry phase, and means for driving the actuators; means for automatically reversing the direction of movement of said actuators in either direction to reverse the order of succession of the cyclic phases, including members operable during an extra-cyclic movement of the actuators to effect the reversal.

45. In a calculating machine having a transversely shiftable carriage reversible numeral wheels thereon, reversible actuators for said wheels and means for automatically reversing said actuators; carriage shifting means including a control device cooperating with said reversing means in the movement thereof to reverse the actuators from positive to negative operation and idle under all other conditions of the machine, and means for setting said carriage shifting means idly into position to respond to its said control device.

46. In a calculating machine having a transversely shiftable carriage, reversible numeral wheels thereon, actuators for said wheels having a reversible cycle of operation comprising a plus tens carry phase, an ordinal registration phase and a minus tens carry phase, and means for driving the actuators; means for automatically reversing the direction of movement of said actuators to reverse the order of succession of the cyclic phases, said reversing means providing for a zone of idle actuator movement, upon reversal, including the idle carry phase of the reversed cycle, and means operable to shift the carriage automatically during movement of the actuators through said idle zone.

In testimony whereof I affix my signature.

GEORGE C. CHASE.